United States Patent
Imai

(10) Patent No.: US 10,103,971 B2
(45) Date of Patent: Oct. 16, 2018

(54) ROUTE SEARCH APPARATUS AND ROUTE SEARCH METHOD

(71) Applicant: FUJITSU LIMITED, Kawasaki-shi, Kanagawa (JP)

(72) Inventor: Satoshi Imai, Kawasaki (JP)

(73) Assignee: FUJITSU LIMITED, Tokyo (JP)

( * ) Notice: Subject to any disclaimer, the term of this patent is extended or adjusted under 35 U.S.C. 154(b) by 102 days.

(21) Appl. No.: 15/274,581

(22) Filed: Sep. 23, 2016

(65) Prior Publication Data
US 2017/0111262 A1    Apr. 20, 2017

(30) Foreign Application Priority Data

Oct. 15, 2015  (JP) .................................. 2015-203826

(51) Int. Cl.
*H04L 12/721* (2013.01)
*H04L 12/733* (2013.01)
*H04L 12/753* (2013.01)

(52) U.S. Cl.
CPC .......... *H04L 45/123* (2013.01); *H04L 45/122* (2013.01); *H04L 45/48* (2013.01)

(58) Field of Classification Search
None
See application file for complete search history.

(56) References Cited

U.S. PATENT DOCUMENTS

| | | | | |
|---|---|---|---|---|
| 5,233,604 A * | 8/1993 | Ahmadi | ................. | H04L 45/123 370/238 |
| 5,600,638 A * | 2/1997 | Bertin | ..................... | H04L 45/00 370/255 |
| 6,201,810 B1 * | 3/2001 | Masuda | ................... | H04L 45/04 370/237 |
| 2005/0169183 A1 * | 8/2005 | Lakkakorpi | ............... | H04L 1/22 370/238 |
| 2006/0159082 A1 * | 7/2006 | Cook | ...................... | H04L 45/02 370/389 |
| 2006/0259597 A1 * | 11/2006 | Jiang | ..................... | H04W 40/20 709/222 |
| 2007/0195702 A1 * | 8/2007 | Yuen | ..................... | H04L 45/121 370/238 |
| 2011/0103398 A1 | 5/2011 | Mitsunobu et al. | | |
| 2011/0228777 A1 * | 9/2011 | Samajpati | ............. | H04W 40/10 370/392 |

(Continued)

FOREIGN PATENT DOCUMENTS

| | | |
|---|---|---|
| JP | 6-97964 | 4/1994 |
| JP | 7-162415 | 6/1995 |
| JP | 2008-54211 | 3/2008 |

OTHER PUBLICATIONS

Extended European Search Report dated Mar. 21, 2017, in corresponding European Patent Application No. 16191380.1.

*Primary Examiner* — Eunsook Choi
(74) *Attorney, Agent, or Firm* — Staas & Halsey LLP

(57) ABSTRACT

A route search apparatus includes a storage configured to store information of a search tree associated with a topology of a network, and a processor configured to search for candidates of a route from a start point node to an end point node and exclude from search candidates a route from a first node to the end point when a total value of a hop length from the start point node to the first node and the shortest hop length from the first node to the end point node exceeds a predetermined hop length.

10 Claims, 20 Drawing Sheets

(56) References Cited

U.S. PATENT DOCUMENTS

2011/0261702 A1* 10/2011 Shimonishi ............. H04L 45/18
370/249
2017/0346720 A1* 11/2017 Lazzeri ................. H04L 45/124

* cited by examiner

COMPARATIVE EXAMPLE
(583 NODES/754 LINKS/SHORTEST HOP LENGTH IS 32 HOPS)

| [SECOND] | PATTERN 1 | PATTERN 2 | PATTERN 3 |
|---|---|---|---|
| SHORTEST HOP LENGTH | 4997.850 | 4877.567 | 4972.727 |
| SHORTEST + 1 | 8674.444 | 8769.929 | 8455.512 |
| SHORTEST + 2 | 15065.142 | 15281.584 | 15278.651 |
| SHORTEST + 3 | 26752.741 | 26760.661 | 26734.656 |

FIRST EMBODIMENT
(583 NODES/754 LINKS/SHORTEST HOP LENGTH IS 32 HOPS)

| [SECOND] | PATTERN 1 | PATTERN 2 | PATTERN 3 |
|---|---|---|---|
| SHORTEST HOP LENGTH | 0.0220000744 | 0.0160000324 | 0.0149998665 |
| SHORTEST + 1 | 0.1409997940 | 0.1090002060 | 0.0469999313 |
| SHORTEST + 2 | 0.4990000725 | 0.4679999352 | 0.1720001698 |
| SHORTEST + 3 | 2.0750000477 | 2.0750000477 | 0.5299999714 |

COMPARATIVE EXAMPLE
(10000 NODES/9999 LINKS/SHORTEST HOP LENGTH IS 25 HOPS)

CALCULATION DOES NOT FINISH EVEN AFTER A FEW DAYS OF CALCULATION

FIRST EMBODIMENT
(10000 NODES/9999 LINKS/SHORTEST HOP LENGTH IS 25 HOPS)

| [SECOND] | PATTERN 1 | PATTERN 2 | PATTERN 3 |
|---|---|---|---|
| SHORTEST HOP LENGTH | 9.73399997 | 9.62599993 | 9.92100000 |
| SHORTEST + 1 | 9.43799996 | 9.73500013 | 9.79600000 |
| SHORTEST + 2 | 17.26900005 | 17.17599988 | 17.51900010 |
| SHORTEST + 3 | 18.53299999 | 17.19099998 | 16.95700000 |

FIG. 17
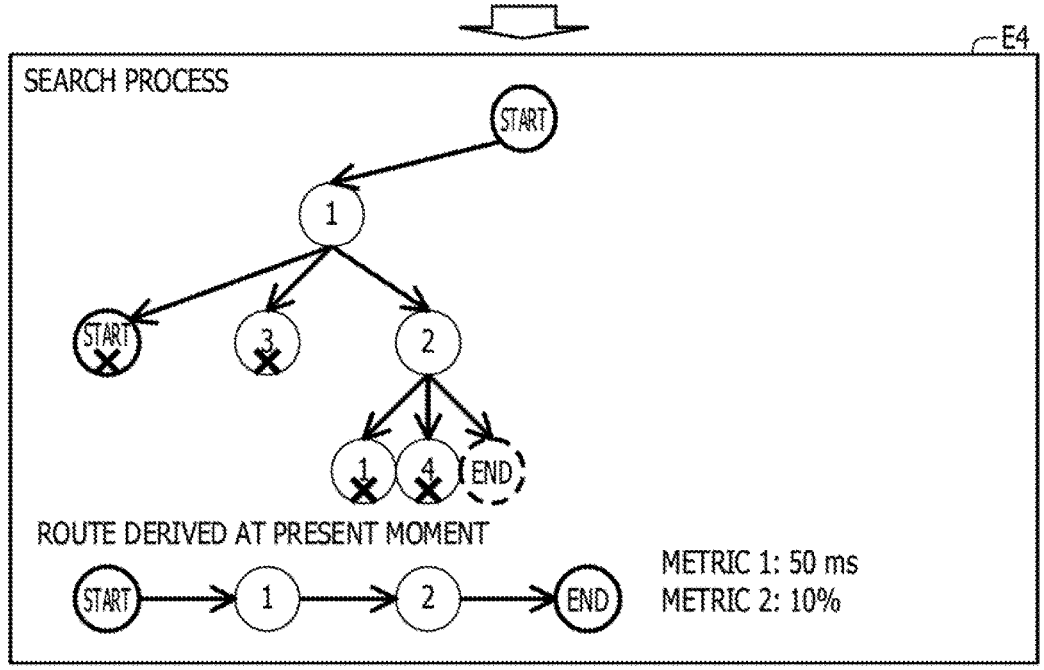
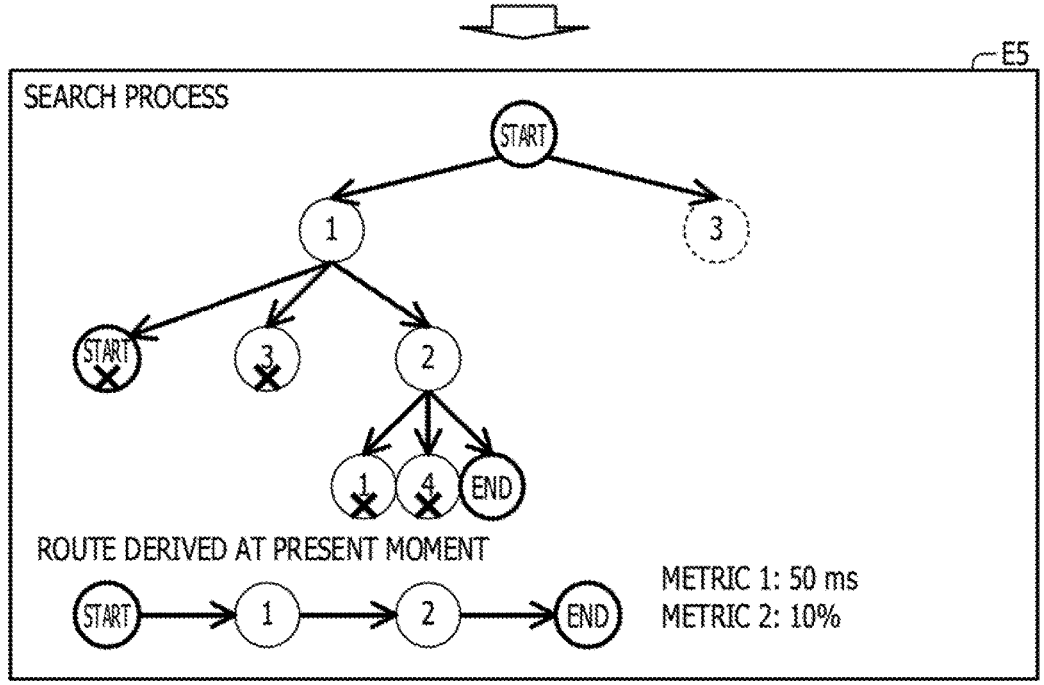

FIG. 18
FROM E5 OF FIG. 17
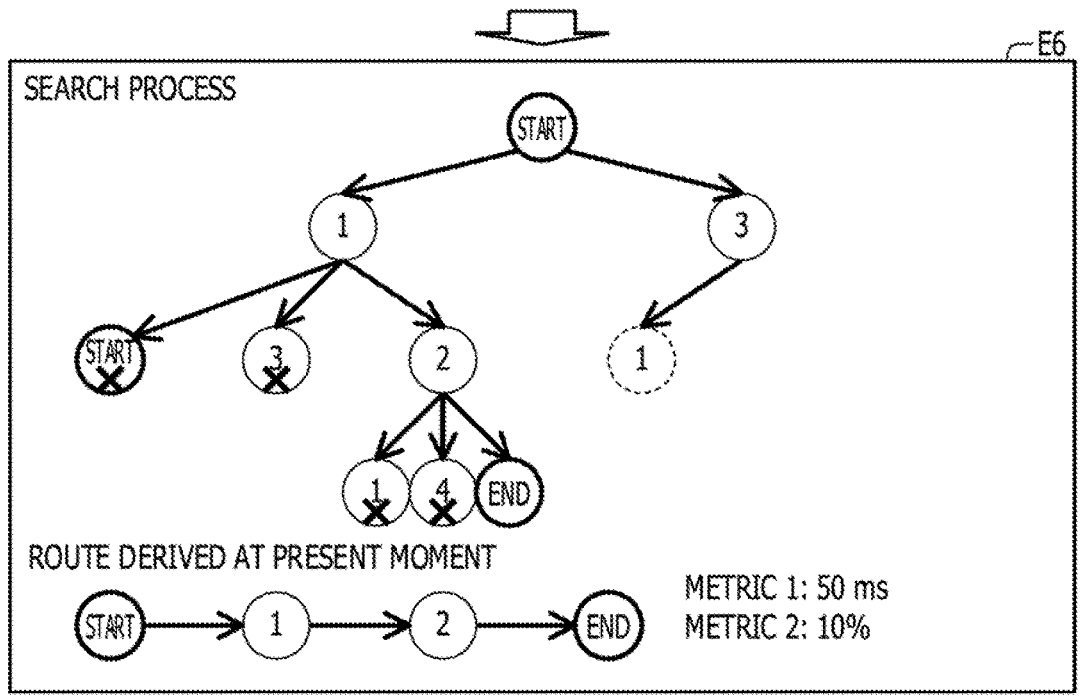
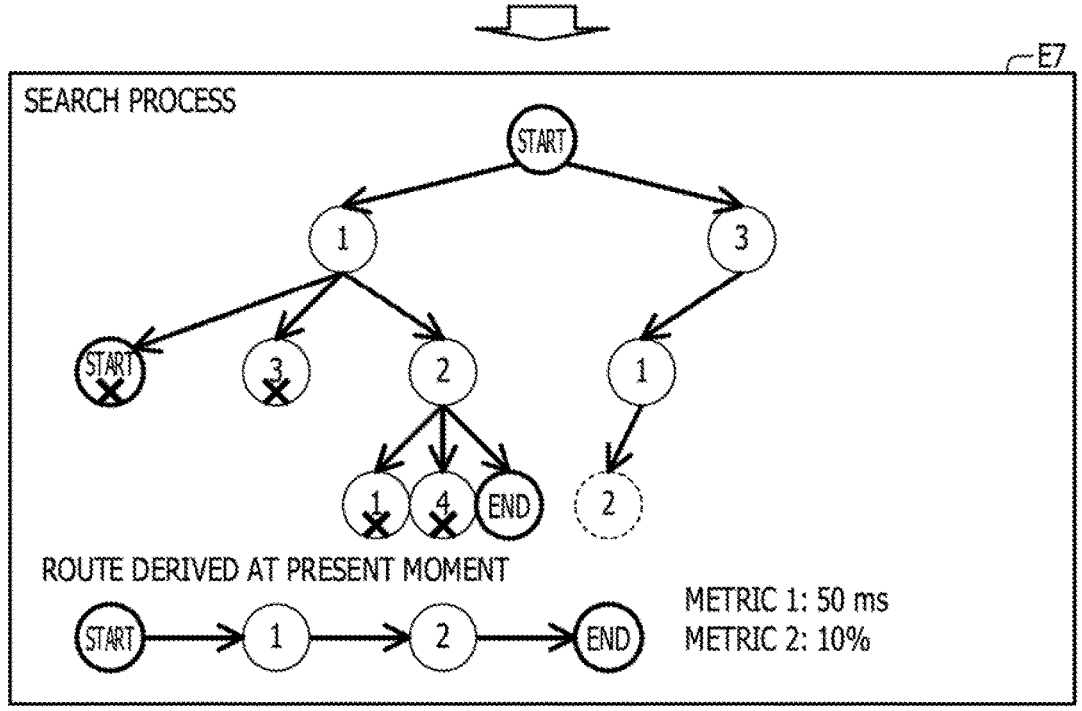
TO E8 OF FIG. 19

ROUTE SEARCH APPARATUS AND ROUTE SEARCH METHOD

CROSS-REFERENCE TO RELATED APPLICATION

This application is based upon and claims the benefit of priority of the prior Japanese Patent Application No. 2015-203826, filed on Oct. 15, 2015, the entire contents of which are incorporated herein by reference.

FIELD

The embodiments discussed herein are related to a route search apparatus.

BACKGROUND

For a network system that centrally controls designing and configuration of communication routes, there is a technique to receive a request for route construction (which may also be referred to as "route search") from an operator, and to, in response to the request, search for a communication route from a start point node to an end point node that satisfies the quality requested by the operator.

Dijkstra's algorithm is known as a method of implementing a search for a route that satisfies conditions such as a hop length. Dijkstra's algorithm uses a metric value defined for each link and identifies a single route that has the smallest sum of metric values among routes. A "metric value" may also be referred to as an "index" or a "cost value".

A metric value is a route length (which may also be referred to as "hop length" or "the number of hops"), for example. "Hop length" is the number of nodes that are passed from a start point node to an end point node.

There is a depth-first search method as a method of extracting a route candidate. The "depth-first search method" generates a search tree having a start point node as a root node (which may also be referred to a "root") and sequentially search nodes down to a predetermined hop length (or a depth).

As examples of prior-art, are known Japanese Laid-open Patent Publication Nos. 7-162415, 6-97964 and 2008-54211 and the like.

SUMMARY

According to an aspect of the invention, a route search apparatus includes a storage configured to store information of a search tree associated with a topology of a network, and a processor configured to search for candidates of a route from a start point node to an end point node and exclude from search candidates a route from a first node to the end point when a total value of a hop length from the start point node to the first node and the shortest hop length from the first node to the end point node exceeds a predetermined hop length.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a diagram describing the screen display example of the search process in the route search apparatus of the fourth embodiment;

FIG. 18 is a diagram describing the screen display example of the search process in the route search apparatus of the fourth embodiment;

DESCRIPTION OF EMBODIMENTS

In the case where the above-mentioned "depth-first search method" is applied to a large scale network, the number of routes to be searched (or a search space) is so huge that the calculation may consume a vast amount of time.

In one aspect, the technique described in this specification aims to shorten search time for a network route that satisfies a certain condition.

Embodiments are described hereinafter with reference to the drawings. The embodiments to be described below are only exemplary, however, and there is no intention to preclude application of various variations or technologies that are not demonstrated in the embodiments. More specifically, various variations may be made to the embodiments without deviating from the intent of the embodiments, which may then be implemented.

In addition, each figure is not intended to have only components illustrated in the figure and may include other components. In the following, parts to which an identical symbol is assigned represent an identical or similar part, unless otherwise stated.

[A] First Embodiment

[A-1] Example of a System Configuration

Figure 1:
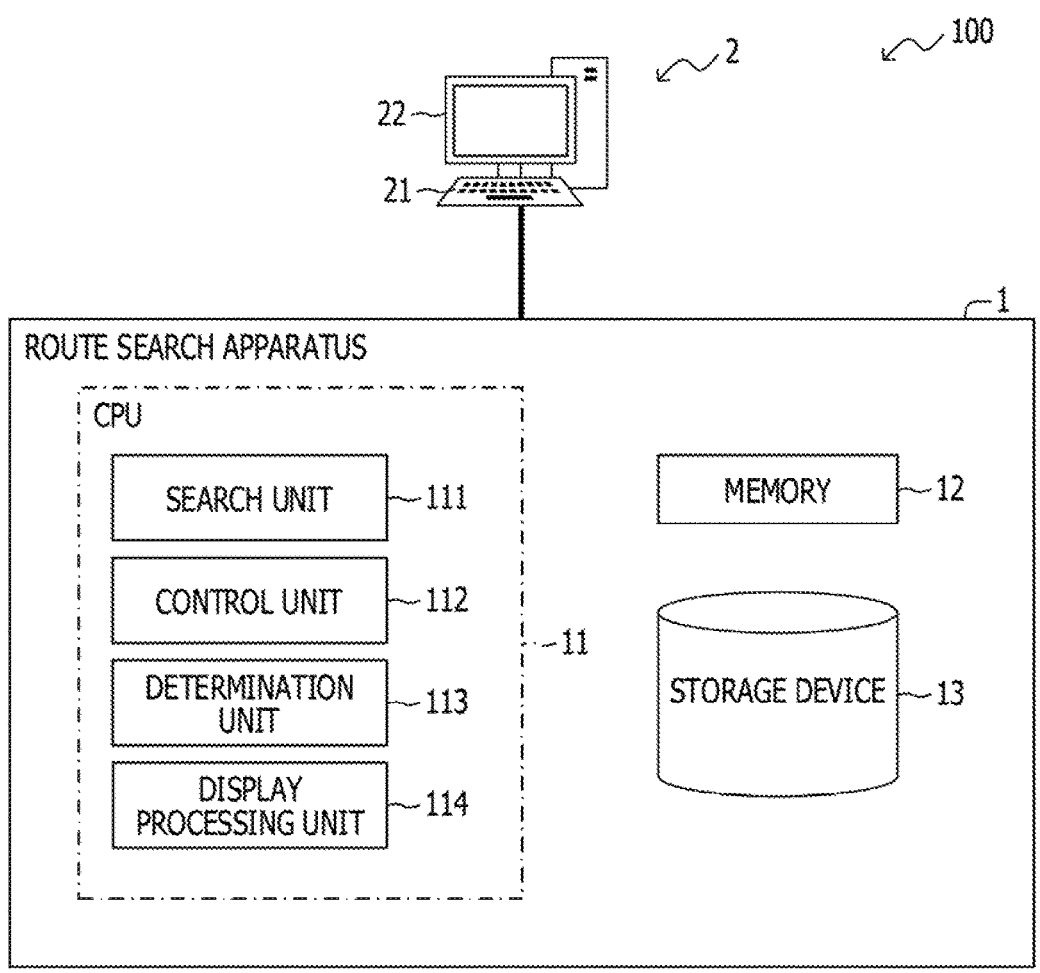
FIG. 1 is a block diagram illustrating a functional configuration example of a route search system of a first embodiment.
Figure 2:
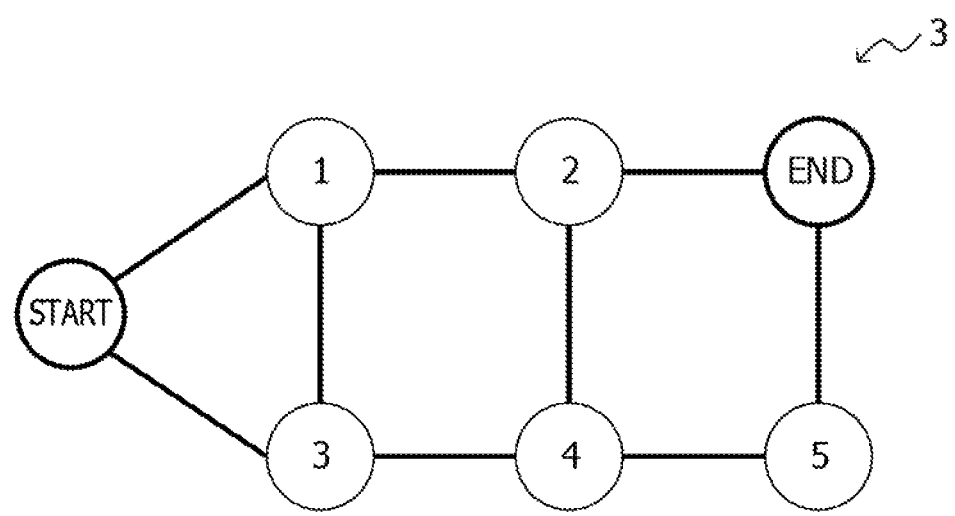
FIG. 2 is a diagram exemplarily illustrating a network topology.

FIG. 1 is a block diagram illustrating a functional configuration example of a route search system 100 of a first embodiment. FIG. 2 is a diagram exemplarily illustrating a topology of a network 3.

A route search system 100 illustrated in FIG. 1 exemplarily searches for one or more route from a start point node to an end point node included in the network 3 as exemplarily illustrated in FIG. 2. Search for a route may be carried out by a route search apparatus 1 included in the route search system 100.

The network 3 illustrated in FIG. 2 exemplarily includes one start point node (see "START" in FIG. 2) and one end point node (see "END" in FIG. 2). The network 3 may also include a plurality of intermediate nodes in a route from the start point node to the end point node. In the example illustrated in FIG. 2, the network 3 may include five intermediate nodes #1 to #5 (see "1" to "5" in FIG. 2).

In the following, a "start point node", an "end point node", and an "intermediate node" may be collectively referred to simply as a "node". Alternatively, "intermediate nodes #1 to #5" may be simply referred to as "nodes #1 to #5". Each node is exemplarily connected so that they may communicate with each other. Numbers "#1 to #5" assigned to intermediate nodes may also be referred to as "node IDs (identifiers)".

A node is exemplarily various devices such as a communication device or a relay device or the like.

A start point node is exemplarily a node that is a transmission source of data when the data is transmitted. An end point node is exemplarily a node that is a destination of data to be transmitted from a start point node. An intermediate node is exemplarily a node by way of which data is transmitted from a start point node to an end point node. "Data" may also be referred to as a "signal" or "information".

Note that the start point node, the end point node, and the intermediate nodes illustrated in FIG. 2 are defined for convenience, and any of the nodes may be referred to as a start point node, an end point node, or an intermediate node, depending on a source and a destination of data.

As illustrated in FIG. 1, the route search system 100 exemplarily includes a route search apparatus 1 and an operator terminal 2. The route search apparatus 1 and the operator terminal 2 may be communicably connected.

The operator terminal 2 exemplarily includes an input device 21 and a display 22.

The input device 21 may be a keyboard, a mouse, or a trackball. An operator may perform various input operations to the operator terminal 2 through the input device 21. The operator may input information for requesting the route search apparatus 1 to search for a route (which may be hereinafter referred to as a "route search request") to the operator terminal 2 through the input device 21.

A route search request may include information or a search condition related to a topology of the network 3, information on a start point node and an end point node, and requested bandwidth.

The information related to the topology of the network 3 may include information on a plurality of nodes included in the network 3 or link between respective nodes.

The search condition may be an allowable value of a hop length in a route from a start point node and an end point node (or the number of nodes to be passed). The search condition may be defined based on the shortest route (or the shortest hop length) from the start point node to the end point node.

The information on a start point node and an end point node may be information to identify a start point node and an end point node.

The requested bandwidth may be a communication rate (in the unit of bps, for example) in a route from a start point node to an end point node.

The display 22 may be a liquid crystal display or a cathode ray tube (CRT), or an electronic paper display, for example. The display 22 may display various types of information to an operator or the like. The display 22 may display one or more route candidates searched by the route search apparatus 1 in response to a route search request.

Note that the input device 21 and the display 22 may be combined and may be a touch panel, for example.

The route search apparatus 1 may be a software defined networking (SDN) manager that controls the network 3 by software. As illustrated in FIG. 1, the route search apparatus 1 may include a central processing unit 11, a memory 12, and a storage device 13.

The storage device 13 is exemplarily a device configured to store data so that the data may be read or written, and, for example, a hard disk drive (HDD) or a solid state drive (SSD) may be used. The storage device 13 may store information on the shortest hop length between respective nodes of the network 3. "Information on the shortest hop length" may be exemplarily generated through the use of Dijkstra's algorithm before route search of the network 3 starts.

The memory 12 is exemplarily a storage device including a read only memory (ROM) and a random access memory (RAM). A program such as a basic input/output system (BIOS) or the like may be written to the ROM of the memory 12. A software program of the memory 12 may be appropriately read in the CPU 11 and executed. In addition, the RAM of the memory 12 may be used as a primary recording memory or a working memory.

The CPU 11 is exemplarily a processor configured to perform various control or operations, and implements various functions by executing an operating system (OS) or a program stored in the memory 12. More specifically, as illustrated in FIG. 1, the CPU 11 may function as a search unit 111, a control unit 112, a determination unit 113, and a display processing unit 114.

Note that a program for implementing a function as the search unit 111, the control unit 112, the determination unit 113, and the display processing unit 114 may be provided in a form recorded in a computer readable recording medium such as a flexible disk, a CD (CD-ROM, CD-R, CD-RW or the like), a DVD (DVD-ROM, DVD-RAM, DVD-R, DVD+R, DVD-RW, DVD+RW, HD DVD or the like), a Blue-ray disk, a magnetic disk, an optical disk, a magneto-optical disk, or the like. Then, a computer (CPU 11 in the embodiment) may read a program from the recording medium described above through a reader (not illustrated), and transfer the program to an internal recording device or an external recording device to store and use the program. In addition, a program may be recorded in a storage device (recording medium) such as a magnetic disk, an optical disk, a magneto-optical disk or the like, and provided to the computer from the storage device through a communication route.

When implementing a function as the search unit 111, the control unit 112, the determination unit 113, and the display processing unit 114, a program stored in the internal storage device (memory 12 in the embodiment) may be executed by the computer (CPU 11 in the embodiment). In addition, a program recorded in the recording medium may be read and executed by the computer.

The CPU 11 exemplarily controls operation of the entire route search apparatus 1. A device for controlling the entire operation of the route search apparatus 1 is not limited to the CPU 11, and may be any one of a micro processing unit (MPU) or a digital signal processor (DSP), an application specific integrated circuit (ASIC), a programmable logic device (PLD), and a field programmable gate array (FPGA). In addition, the device for controlling operation of the entire route search apparatus 1 may be a combination of two or more of a CPU, an MPU, a DSP, an ASIC, a PLD, and an FPGA.

Note that functions as the search unit 111, the control unit 112, the determination unit 113, and the display processing unit 114 of the CPU 11 are described below in conjunction with a description of FIGS. 5 to 7.

Figure 3:
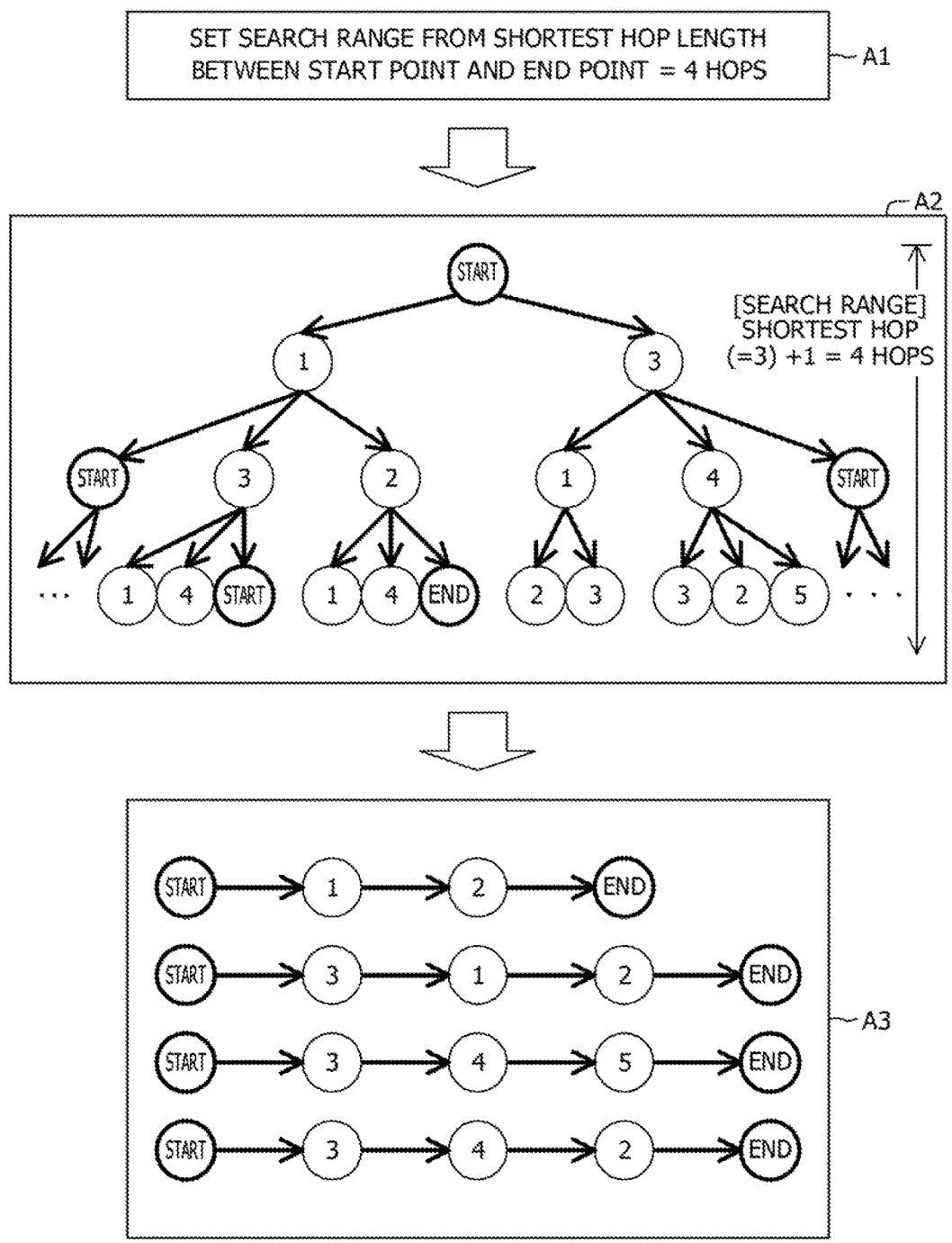
FIG. 3 is a diagram describing a depth-first search method with a search tree.

FIG. 3 is a diagram describing a depth-first search method with a search tree. In FIG. 3, route search from the start point node to the end point node in the network 3 illustrated in FIG. 2 is described using the depth-first search method with the search tree.

Route search using the depth-first search method with the search tree may also be performed by the route search apparatus 1 illustrated in FIG. 1.

First, an operator sets a search range based on the shortest hop length from the start point node to the end point node (see symbol A1 in FIG. 3). In the network 3 illustrated in FIG. 2, the shortest hop length from the start point node to the end point node is "3". Then, the operator may set as the search range 4 hops obtained by adding a hop length "1" as a margin to the shortest hop length "3", for example. Stated differently, the operator may set so that a route for which the hop length from the start point node to the end point node is 4 hops or less is searched out.

Then, the search tree associated with the topology of the network 3 illustrated in FIG. 2 may be developed in the memory 12 (see symbol A2 in FIG. 3). A search tree may include a start point node, an end point node, and an intermediate node as a leaf node, with the start point as a parent node (or a "root node") being as an apex.

Note that in the search tree depicted by symbol A2 in FIG. 3, illustration of some of nodes present at a position at depth of "3" and nodes present at a position at depth of "4" is omitted. Here, "depth" represents a hop length from a start point node located at an apex of a search tree in a case in which depth of the start point node located at the apex of the search tree is "0".

When search on the search tree to the depth "4" is complete, a search result may be obtained (see symbol A3 of FIG. 3). FIG. 3 illustrates an example in which four routes are obtained as search results. A first route is a route reaching an end point node from a start point node through intermediate nodes #1, #2, and a second route is a route reaching an end point node from a start point node through intermediate nodes #3, #1, #2. In addition, a third route is a route reaching an end point node from a start point node through intermediate nodes #3, #4, #5, and a fourth route is a route reaching an end point node from a start point node through intermediate nodes #3, #4, #2.

Figure 4:
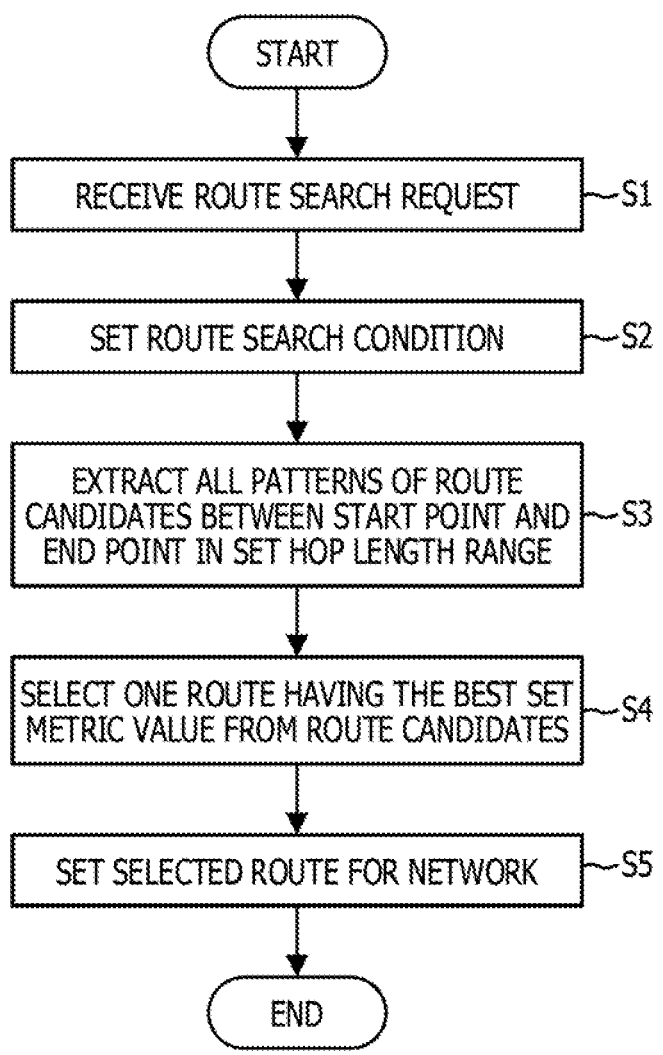
FIG. 4 is a flow chart describing the depth-first method with the search tree.

Next, the route search example using the depth-first search method with the search tree is described according to the flow chart (steps S1 to S5) illustrated in FIG. 4.

The route search apparatus 1 receives a route search request from the operator terminal 2 (step S1).

The route search apparatus 1 sets a hop length condition or a route search condition such as information on a start point node and an end point node, based on the route search request (step S2).

Using the depth-first search method with the search tree, the route search apparatus 1 extracts all patterns of route candidates from the start point node to the end point node in a range of a hop length according to the predetermined hop length condition (step S3).

The route search apparatus 1 selects one route for which a set metric value is best, from the extracted route candidates (step S4).

The route search apparatus 1 configures the network 3 so that data is transmitted using the selected route (step S5).

In this manner, in the route search using the depth-first search method with the search tree, all route candidates that satisfy the hop length range set by the operator are extracted.

However, if an attempt to apply the depth-first search method in a large scale network is made, the number of routes to be searched (or search space) is huge, and thus it is likely that calculation might take a vast amount of time.

Thus, the route search apparatus 1 of the first embodiment may exemplarily abort search on routes that are expected not to satisfy the hop length range set by the operator, of all routes from the start point node to the end point node. A "hop length range" may also be referred to as a "predetermined hop length" or a "search range".

The search unit 111 of the CPU 11 illustrated in FIG. 1 exemplarily searches for a candidate of a route from a start point node to an end point node in the search tree associated with the topology of the network 3. The search unit 111 may search for a route candidate using the depth-first search method.

When a node n+1 connected to a node n in a direction to the end point node is present in a route that satisfies the hop length condition, the search unit 111 may search for a route candidate from routes from the start point node to the end point node through the node n+1.

"n" is a natural number and represents a sequence of nodes searched with the depth-first search method. More specifically, a next node to be searched after the node n is the node n+1 and the natural number "n" may be associated with one node several times.

An example of the "hop length condition" is a condition that a total value of a hop length from a start point node to a node n and the shortest hop length from the node n to an end point node is equal to or less than a predetermined hop length. A determination on whether the "hop length condition" is satisfied may be exemplarily performed by the control unit 112.

The control unit 112 exemplarily determines whether the total value of the hop length from the start point node to the node n and the shortest hop length from the node n to the end point node is equal to or less than the predetermined hop length. Stated differently, the control unit 112 may determine whether the hop length condition is satisfied.

For a route that may not satisfy the hop length condition, the control unit 112 may exclude from the search candidates the route from the node n to the end point node.

When the hop length condition is not satisfied for the node n, the control unit 112 may cause the search unit 111 to search for a route for a node which is connected to the parent node of the node n, and on which search for a route candidate is not yet performed.

When the node n+1 is the end point node, the determination unit 113 exemplarily determines the route from the start point node to the end point node through the node n as a result of the route search.

The display processing unit 114 exemplarily displays the route determined as the route search result by the determination unit 113 in the display 22 included in the operator terminal 2.

[A-2] Example of Operation

Figure 5:
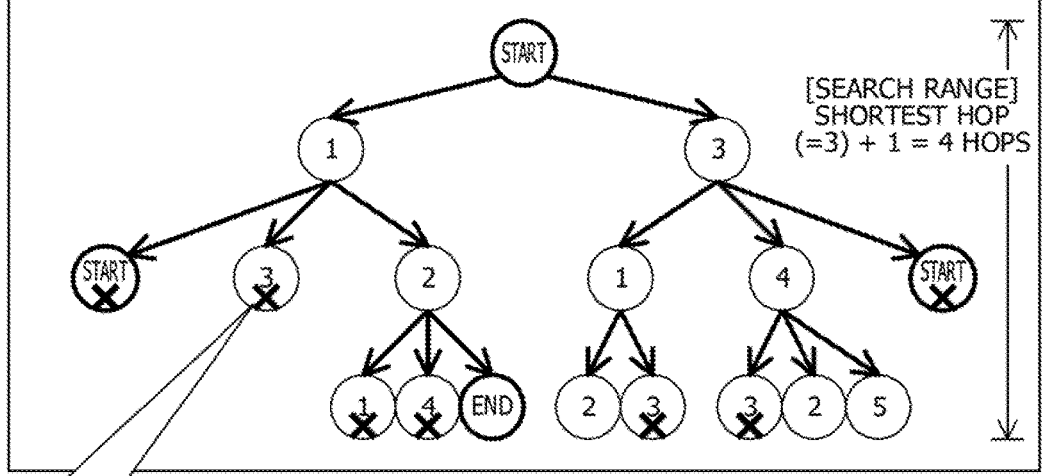
FIG. 5 is a diagram describing a route search example in a route search apparatus of the first embodiment.

FIG. 5 is a diagram describing a route search example in the route search apparatus 1 of the first embodiment.

First, a search range based on the shortest hop length from a start point node to an end point node is set for the route search apparatus 1 through the operator terminal 2 (see symbol B1 of FIG. 5). In the network 3 illustrated in FIG. 2, the shortest hop length from the start point node to the end point node is "3". Then, the operator may set the search range to 4 hops obtained by adding a hop length "1" as a margin to the shortest hop length "3", for example. Stated differently, the operator may set the search range such that a route for which the hop length from the start point node to the end point node is 4 hops or less is searched out.

The control unit 112 may make a search continuation determination at the node n (see symbol B2 of FIG. 5).

If f(START,n)+g(n,END)>search range, which is an example of a determination condition of the search continuation determination, is satisfied, the control unit 112 may exclude the search on and after a next node n+1 from the search candidates. Stated differently, when f(START,n)+g(n,END)>search range is satisfied, the search unit 111 does not have to search for the next node n+1. f(START,n) exemplarily represents a hop length (which may also be referred to as "search hop length") in searched routes from the start point node to the node n. In addition, g(n,END) exemplarily represents the shortest hop length in a route from the node n to the end point node.

When f(START,n)+g(n,END)≤search range, which is an example of a condition of the search continuation determination, is satisfied, the search unit 111 may continue to search on and after the next node n+1.

The search unit 111 may search a candidate of a route from a start point node to an end point node in the search tree associated with the topology of the network 3, according to the result of the search continuation determination (see symbol B3 of FIG. 5). In addition, in FIG. 5, illustration of nodes that are located at a position at depth of "4" and are searched is omitted.

In FIG. 5, nodes marked with "x" indicate that the following search on and after a next node is skipped. For example, in a route from a start point node through nodes #1, #3, a search hop length f(START,3) from the start point node to a node #3=2, and the shortest hop length g(3,END) from the node #3 to the end point node=3. Therefore, f(START,3)+g(3,END)=5, and the total value of the search hop length and the shortest hop length exceeds the search range. Then, search on each node corresponding to a leaf node of the node #3 is excluded from the search candidates.

The determination unit 113 may determine the route to the end point node where depth "4" is present at the following position, as a result of route search (see symbol B4 of FIG. 5).

FIG. 5 illustrates an example in which four routes are obtained as a search result. A first route is a route reaching an end point node from a start point node through intermediate nodes #1, #2, and a second route is a route reaching an end point node from a start point node through intermediate nodes #3, #1, #2. In addition, a third route is a route reaching an end point node from a start point node through intermediate nodes #3, #4, #5, and a fourth route is a route reaching an end point node from a start point node through intermediate nodes #3, #4, #2.

The display processing unit 114 may display the route search result determined by the determination unit 113 in the display 22 of the operator terminal 2.

Figure 6:
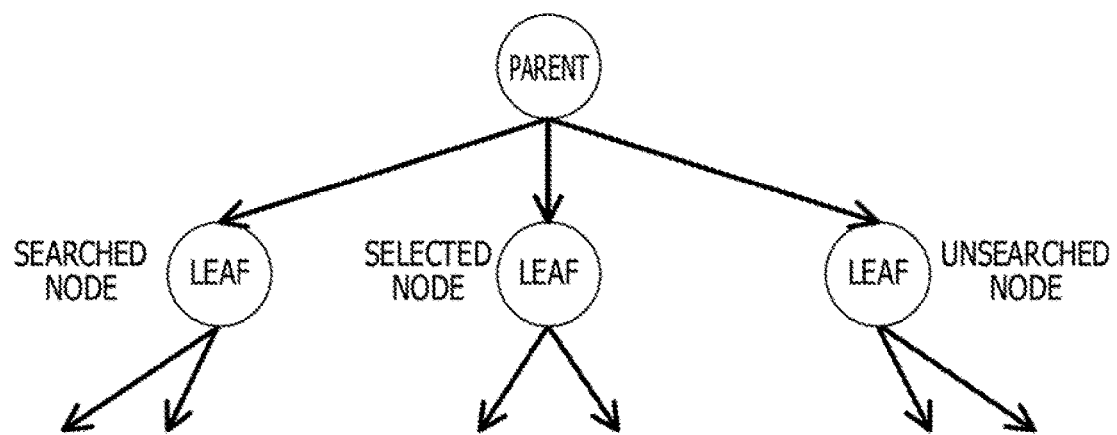
FIG. 6 is a diagram describing nodes in the search tree.
Figure 7:
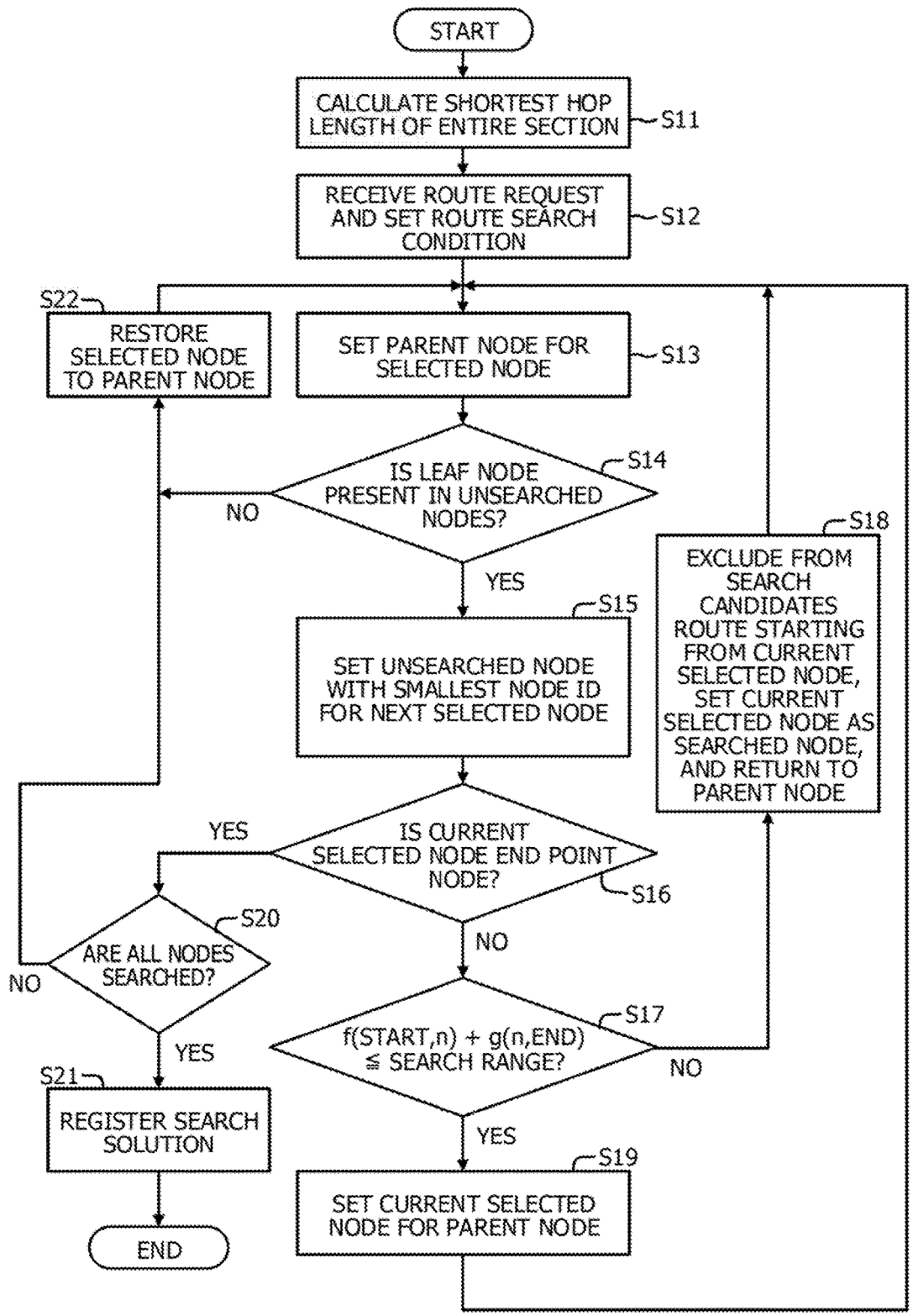
FIG. 7 is a flow chart describing the route search example in the route search apparatus of the first embodiment.

Then, the route search example in the route search apparatus of the first embodiment is described following the flow chart (steps S11 to S22) illustrated in FIG. 7, using the node designations described in FIG. 6.

As illustrated in FIG. 6, under a parent node (or in a depth direction), one or more leaf nodes may be connected. Leaf nodes may be classified to a searched node, a selected node, and unsearched node. A "searched node" is a node on which route search by the search unit 111 is complete. A "selected node" is a node on which route search by the search unit 111 is being performed. A "unsearched node" is a node on which route search by the search unit 111 has not yet been performed.

The search unit 111 calculates the shortest hop length in an entire section (or across nodes) of the network 3 (step S11 in FIG. 7). The calculated shortest hop length of the entire section may be stored in the storage device 13, for example. In addition, calculation of the shortest hop length of the entire section may be performed in advance before route search starts, such as when a configuration of the network 3 is changed, or the like.

The search unit 111 receives a route search request from the operator through the operator terminal 2, and sets a route search condition based on the route search request (step S12 in FIG. 7). Information on the set route search condition may be stored in the storage device 13, for example. The information on the route search condition may exemplarily include a search range, information on a start point node and an end point node, and a metric value.

The search unit 111 may set a parent node for a selected node (step S13 of FIG. 7).

The search unit 111 determines whether there is any unsearched node in leaf nodes (step S14 of FIG. 7).

When there is any unsearched node in the leaf nodes (see Yes route in step S14 of FIG. 7), the search unit 111 sets for a next selected node a node that is an unsearched node and has the smallest node ID (step S15 of FIG. 7).

The determination unit 113 determines whether a current selected node is an end point node (step S16 of FIG. 7).

When the current selected node is not the end point node (see No route in step S16 of FIG. 7), the control unit 112 determines whether f(START,n)+g(n,END)≤search range, which is an example of the determination condition of the search continuation determination, is satisfied (step S17 of FIG. 7).

When f(START,n)+g(n,END)≤search range is not satisfied (see No route in step S17 of FIG. 7), the control unit 112 excludes a route from the current selected node to the end point node from the search candidates. The search unit 111 sets the current selected node for the searched node, and restores (or sets) the selected node to the parent node (step S18 of FIG. 7). Then, processing returns to step S13 of FIG. 7.

On the other hand, when f(START,n)+g(n,END)≤search range is satisfied, (see Yes route in step S17 of FIG. 7), the search unit 111 sets the current selected node for the parent node (step S19 of FIG. 7). Then, processing returns to step S13 of FIG. 7.

In step S16 of FIG. 7, when the current selected node is the end point node (see Yes route in step S16 of FIG. 7), the determination unit 113 determines whether search on all nodes in the network 3 is done (step S20 of FIG. 7).

When the search on the all nodes is done (see Yes route in step 20 of FIG. 7), the determination unit 113 registers a search solution (or a searched route) in information stored in the storage device 13, for example (step S21 of FIG. 7). If there is a plurality of search solutions, the determination unit 113 may register a search solution whose metric value is best in the information stored by the storage device 13. Then, processing ends.

On the other hand, if search on all nodes is not done (see No route in step S20 of FIG. 7), the search unit 111 restores (or sets) the selected node to the parent node (step S22 of FIG. 7). Then, processing returns to step S13 of FIG. 7.

In step S14 of FIG. 7, when there is no unsearched node in the leaf nodes (see No route in step S14 of FIG. 7), processing shifts to step S22 of FIG. 7.

In this manner, in the first embodiment, in the search tree associated with the topology of the network 3, the search unit 111 may search for a candidate of a route from a start point node to an end point node. In addition, for a route that does not satisfy the hop length condition, the control unit 112 may exclude the route from a node n to the end point node from the search candidates. An example of the "hop length condition" is a condition that a total value of a hop length from a start point node to a node n and the shortest hop length from the node n to an end point node is equal to or less than a predetermined hop length.

This makes it possible to abort search (or reduce unwanted search) of a route that is likely to exceed the predetermined hop length, thus being able to shorten search time of a route of the network 3 that satisfies a certain condition. In addition, if a configuration of the network 3 is extended and/or changed, a route between nodes may be changed. However, since the route search time may be shortened, extension and/or change of the configuration of the network 3 may be facilitated.

When a node n+1 connected to a direction from the node n toward the end point node is present, for a route that satisfies the hop length condition, the search unit 111 may search for a route candidate from the start point node to the end point node through the node n+1.

This enables appropriate continuation of search for a route that may be equal to or less than the predetermined hop length.

When the node n+1 is the end point node, the determination unit 113 determines a route from the start point node to the end point node through the node n as a result of route search.

This enables extraction of an appropriate route for which the hop length from the start point node to the end point node is equal to or less than the predetermined hop length, from within the network 3. Specifically, an appropriate communication route that satisfies the condition may be searched at high speed and the communication route may be extracted.

The search unit 111 searches for a route candidate, placing priority on the node n+1 connected to the depth direction in the search tree.

This enables search without omission of a route for which the hop length from the start point node to the end point node in the network 3 is equal to or less than the predetermined hop length, and may improve reliability of the route search apparatus 1.

Figure 8:
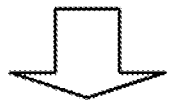
FIG. 8 is a diagram comparing search time in the route search example in the first embodiment with search time in a comparative example.
Figure 9:
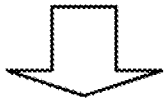
FIG. 9 is a diagram comparing the search time in the route search example in the first embodiment with the search time in the comparative example.

FIGS. 8 and 9 are diagrams comparing search time of the route search example in the first embodiment with search time of a comparative example.

In FIG. 8, in the network 3 including 583 nodes and 754 links, search time [seconds] in searching for a route from a start point node to an end point node with the shortest hop length of 32 hops is illustrated exemplarily. In addition, FIG. 8 illustrates an example in which a predetermined hop length is the shortest hop length or a hop length obtained by adding any of 1 to 3 hops to the shortest hop length, and three patterns of routes are searched out for each of the predetermined hop lengths.

As illustrated exemplarily in FIG. 8, in the route search example in the first embodiment, a route of each pattern may be searched within time of approximately $10^{-5}$ to $10^{-4}$, when compared with the depth-first search method with a search tree as a comparative example.

In FIG. 9, in the network 3 including 10000 nodes and 9999 links, search time [seconds] in searching for 3 patterns of routes from a start point node to an end point node with the shortest hop length being 25 hops is illustrated exemplarily. In addition, FIG. 9 illustrates an example in which a predetermined hop length is the shortest hop length or a hop length obtained by adding any of 1 to 3 hops to the shortest hop length, and three patterns of routes are searched out for each of the predetermined hop lengths.

As illustrated exemplarily in FIG. 9, in the depth-first search method of the search tree as the comparative example, calculation may not finish even if the calculation is performed for a few days. On the other hand, in the route search example in the first embodiment, if the predetermined hop length is the shortest hop length of the hop length obtained by adding 1 hop to the shortest hop length, a route of each pattern may be searched in less than 10 seconds. In addition, in the route search example in the first embodiment, if the predetermined hop length is the hop length obtained by adding 2 or 3 hops to the shortest hop length, a route of each pattern may be searched in at most less than 19 seconds.

[B] Second Embodiment

[B-1] Example of a System Configuration

In a second embodiment, a control unit 112 may determine a metric value in the search continuation determination, in addition to the determination of a search range in the first embodiment described above. A "metric value" may also be referred to as an "index" or "cost value".

A metric value also includes delay time or line load, for example, in addition to the hop length described above. "Delay time" is exemplarily time taken for a node to receive data and then to transmit the data. In addition, "link load" is exemplarily, a proportion of data transmission in a transmission band of a link.

An operator terminal 2 may transmit to a route search apparatus 1 a route search request to which information on a set metric value (which may also be referred to as a "set cost value") is appended, based on input from the operator. A set metric value is an allowable metric value desired by the operator. For example, if delay time is selected as a metric value, 10 ms (milliseconds) are set for the set metric value. In addition, for example, when link load is selected as a metric value, 40% is set for the metric value.

The control unit 112 exemplarily determines for a metric value which is different from a hop length whether a sum of a metric value from a start point node to a node n and a metric value in the shortest route from the node n to an end point node is equal to or less than a reference metric value. A "reference metric value" may also be referred to as a "reference cost value".

A search unit 111 may set as a reference metric value the best (minimum, for example) metric value in one or more searched route. The search unit 111 may also set as an initial value of the reference metric value a metric value which is in a route from the start point node to the end point node and which is equal to or less than the set metric value.

When the hop length condition is satisfied, the control unit 112 may make a determination on a metric value. Similar to the first embodiment described above, a "hop length condition" may be a condition that a total value of a hop length from a start point node to a node n and the shortest hop length from the node n to an end point node is equal to or less than a predetermined hop length.

When the metric value condition is not satisfied, the control unit 112 may exclude a route from the node n to the end point node from search candidates. An example of the "metric value condition" is a condition that a sum of a metric value from a start point node to a node n and a minimum metric value from the node n to an end point node is equal to or less than a reference metric value.

When the hop length condition and the metric value condition are satisfied and a node n+1 connected to a direction from the node n toward the end point node is present, the search unit 111 may search for a candidate of a route from the start point node to the end point node through a node n+1.

A determination unit 113 may determine a route to be set for the network 3 a route with the best metric value, of one or more route which is from the start point node to the end point node and which is searched out by the search unit 111. Stated differently, the determination unit 113 may determine as a route to be set for a network 3 a node from the start point node to the end point node that is lastly searched by the search unit 111.

[B-2] Example of Operation

Figure 10:
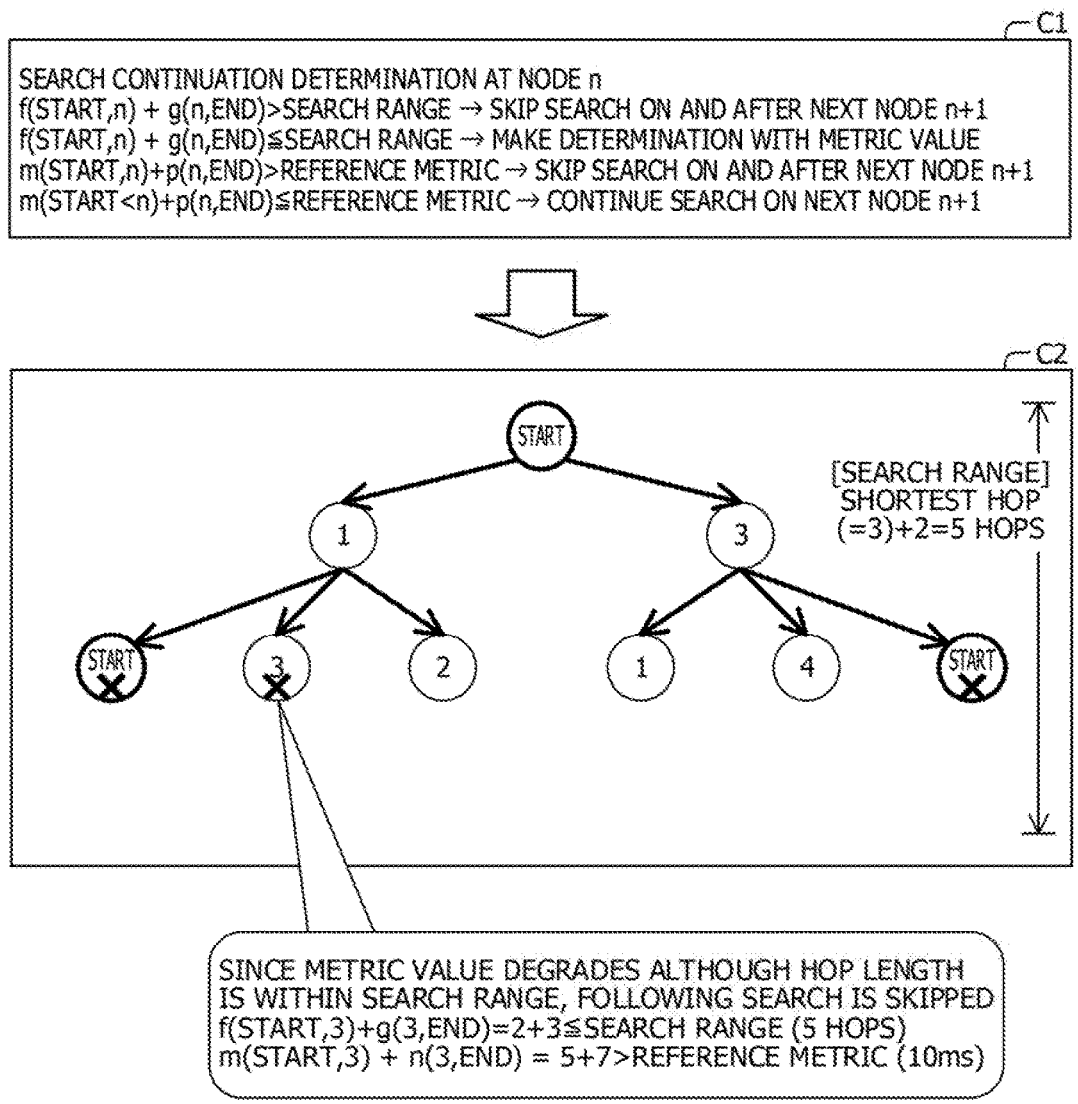
FIG. 10 is a diagram describing a route search example in a route search apparatus of a second embodiment.

FIG. 10 is a diagram describing a route search example in a route search apparatus 1 of a second embodiment.

The control unit 112 may make a search continuation determination at a node n (see symbol C1 of FIG. 10).

When f(START,n)+g(n,END)>search range, which is an example of the condition of the search continuation determination, is satisfied, the control unit 112 may exclude search on and after a next node n+1 from search candidates. Stated differently, when f(START,n)+g(n,END)>search range is satisfied, the search unit 111 does not have to search for the next node n+1.

When f(START,n)+g(n,END)≤search range, which is an example of the condition of the search continuation determination, is satisfied, the control unit 112 may make a determination on a metric value.

When m(START,n)+p(n, end)>reference metric value, which is an example of the condition of the search continuation determination, the control unit 112 may exclude search on and after the next node n+1 from the search candidates. Stated differently, when m(START,n)+p(n,END)>reference metric value is satisfied, the search unit 111 does not have to search for the next node n+1. m(START,n) exemplarily represents a sum (which may also be referred to as a "search metric value") of metric values in searched routes from the start point node to the node n. In addition, p(n,END) exemplarily represents a sum of metric values in the shortest route from the node n to the end point node.

In addition, when Max (m(START,n), p(n,END))>reference metric value, which is another example of the condition of the search continuation determination, is satisfied, the control unit 112 may exclude the search on and after the next node n+1 from the search candidates. Stated differently, when Max (m(START,n), p(n,END))>reference metric value is satisfied, the search unit 111 does not have to search for the next node n+1. Max (m(START,n), p(n,END)) exemplarily indicates a maximum metric value of one or more metric values in searched routes from the start point node to the node n and one or more metric values in the route from the node n to the end point node.

When m(START,n)+(n,END)≤search range, which is an example of the condition of the search continuation determination, is satisfied, the search unit 111 may continue the search on and after the next node n+1.

In addition, when Max (m(START,n), p(n,END))≤reference metric value, which is another example of the condition of the search continuation determination, is satisfied, the search unit 111 may continue the search on and after the next node n+1.

The search unit 111 may search for a route candidate from the start point node to the end point node in the search tree associated with the topology of the network 3, according to the result of the search continuation determination (see symbol C2 of FIG. 10). In FIG. 10, illustration of nodes that are present at a position at depth of "4" and "5" and searched is omitted.

In FIG. 10, nodes marked with "x" indicate that the following search on and after a next node is skipped.

For example, in a route from a start point node through nodes #1, #3, a search hop length from the start point node to the node #3 is f(START,3)=2, and the shortest hop length from the node #3 to the end point node is g(3,END)=3. Therefore, f(START,3)+g(3,END)=5, and a total value of the search hop length and the shortest hop length falls within 5 hops, which is the search range.

However, a search metric value from the start point node to the node #3 is m(START 3)=5, and a metric value in the shortest route from the node #3 to the end point node is p(3,END)=7 ms. Therefore, m(START,3)+p(3,END)=12 ms, and a sum of the search metric value and the metric value in the shortest route from the node #3 to the end point node exceeds 10 ms, which is the reference metric value.

Then, since the metric value degrades although the hop length is in the search range, search on each node corresponding to a leaf node of the node #3 is excluded from the search candidates.

In the following, a route search example in the route search apparatus 1 of the second embodiment is described according to the flow chart (step S31 to S45) illustrated in FIGS. 11 and 12. In addition, FIG. 11 illustrates processing from steps S31 to S36 and S42 to S45, and FIG. 12 illustrates processing from step S37 to S41.

Figure 11:
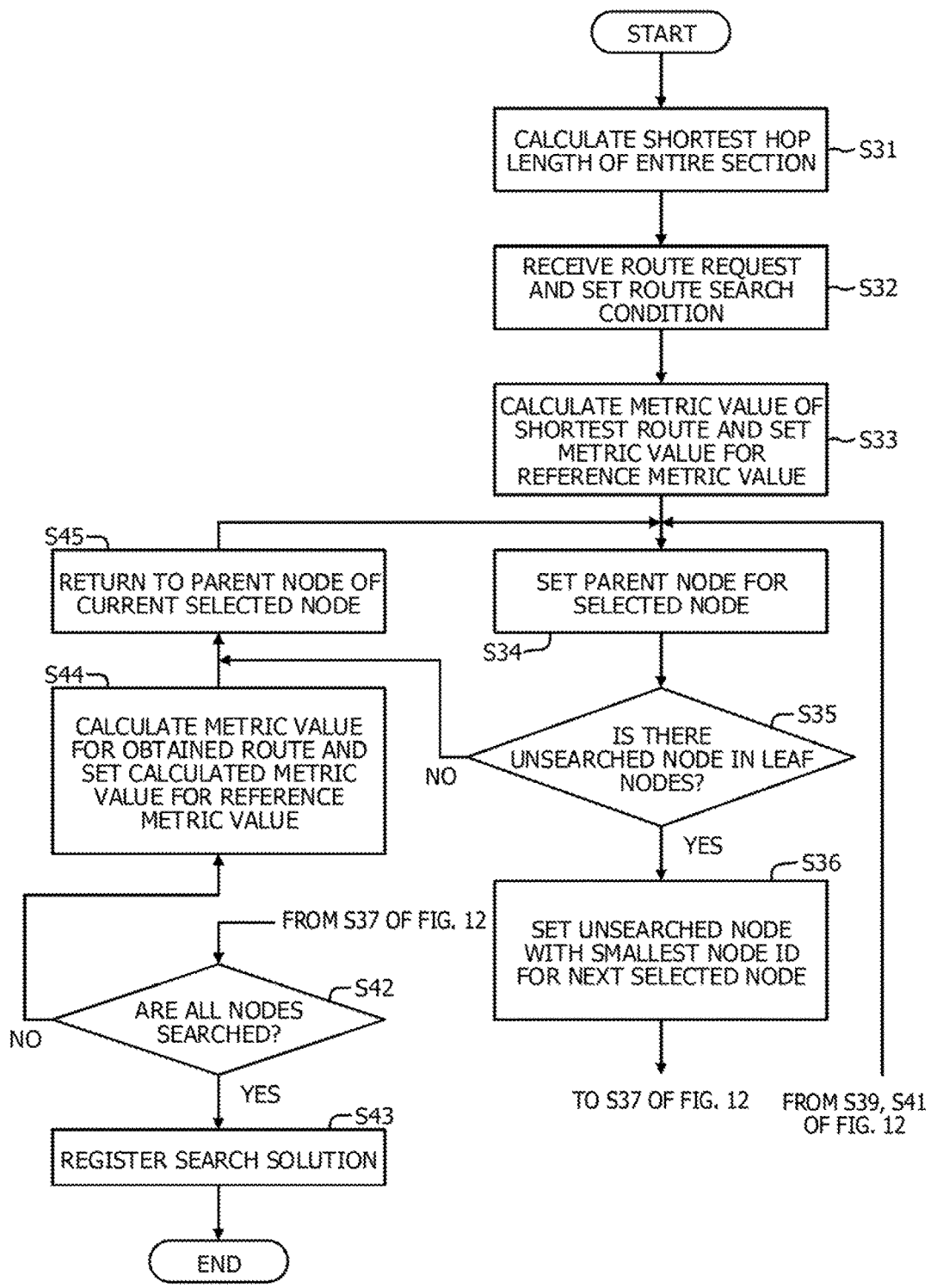
FIG. 11 is a flow chart describing the route search example in the route search apparatus of the second embodiment.
Figure 12:
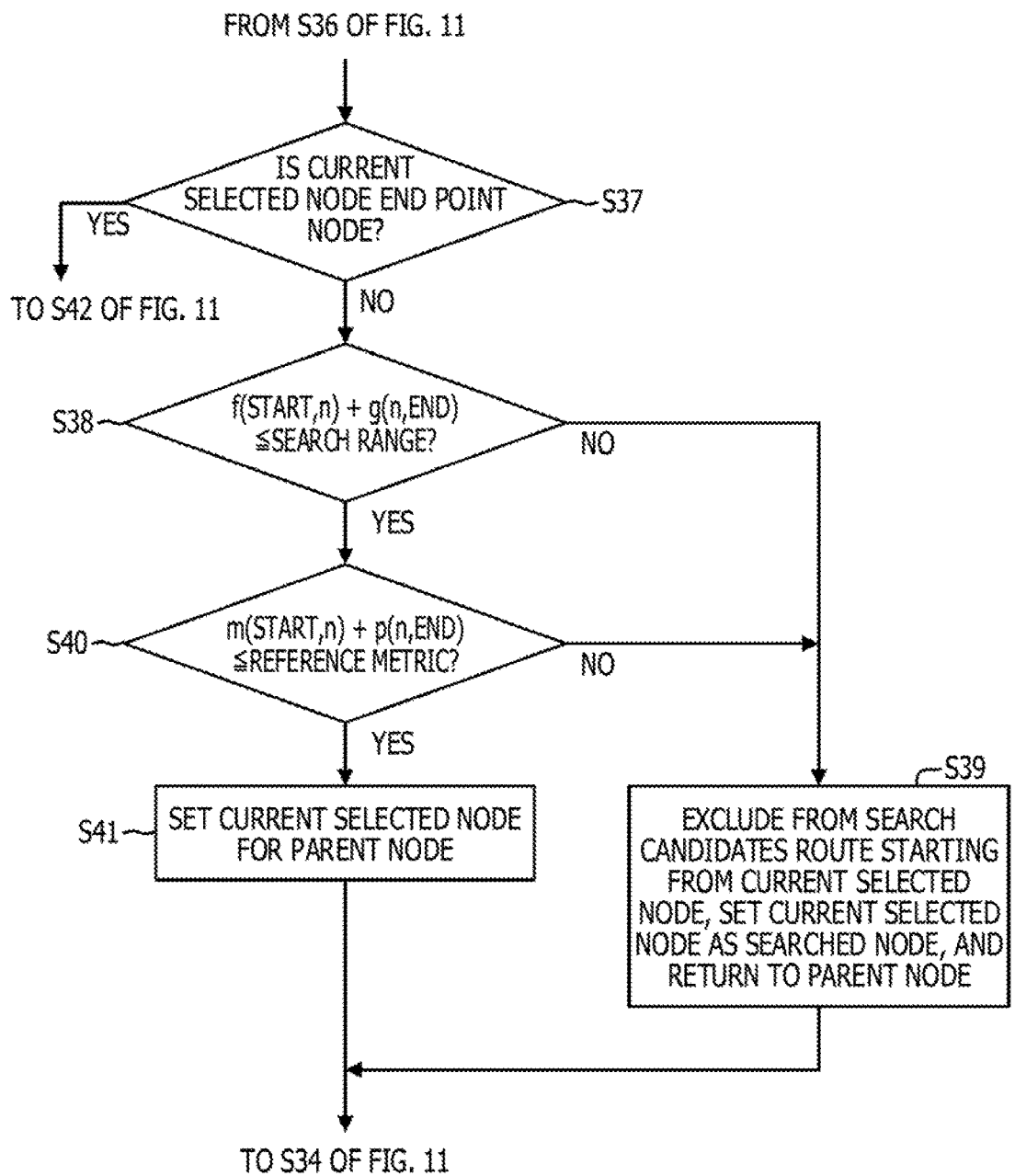
FIG. 12 is a flow chart describing the route search example in the route search apparatus of the second embodiment.

The search unit 111 calculates the shortest hop length in an entire section (or across nodes) of the network 3 (step S31 of FIG. 11). The storage device 13, for example, may store the calculated shortest hop length of the entire section. In addition, calculation of the shortest hop length of the entire section may be performed in advance before route search starts, such as when a configuration of the network 3 is changed, or the like.

The search unit 111 receives a route search request from the operator through the operator terminal 2, and sets a route search condition based on the route search request (step S32 in FIG. 11). Information on the set route search condition may be stored in the storage device 13, for example. The information on the route search condition may exemplarily include a search range, information on a start point node and an end point node, and a metric value.

The search unit 111 calculates a metric value of the shortest route from the start point node to the end point node and sets the metric value for a reference metric value (step S33 of FIG. 11). The set reference metric value may be stored in the storage device 13, for example.

The search unit 111 sets a parent node for a selected node (step S34 of FIG. 11).

The search unit 111 determines whether there is any unsearched node in leaf nodes (step S35 of FIG. 11).

When there is any unsearched node in the leaf nodes (see Yes route in step S35 of FIG. 11), the search unit 111 sets for a next selected node a node that is an unsearched node and has the smallest node ID (step S36 of FIG. 11).

The determination unit 113 determines whether a current selected node is an end point node (step S37 of FIG. 12).

When the current selected node is not the end point node (see No route in step S37 of FIG. 12), the control unit 112 determines whether f(START,n)+g(n,END)≤search range is satisfied (step S38 of FIG. 12).

When f(START,n)+g(n,END)≤search range is not satisfied (see No route in step S38 of FIG. 12), the control unit 112 excludes a route from the current selected node to the end point node from the search candidates. The search unit 111 sets the current selected node for the searched node, and restores (or sets) the selected node to the parent node (step S39 of FIG. 12). Then, processing returns to step S34 of FIG. 11.

On the other hand, when f(START,n)+g(n,END)≤search range is satisfied, (see Yes route in step S38 of FIG. 12), the control unit 112 determines whether m(START,n)+p(n,END)≤reference metric value is satisfied (step S40 of FIG. 12).

When m(START,n)+p(n,END)≤reference metric value is not satisfied (see No route in step S40 of FIG. 12), processing shifts to step S39 of FIG. 12.

On the other hand, when m(START,n)+p(n,END)≤reference metric value is satisfied (see Yes route in step S40 of FIG. 12), the search unit 111 sets the current selected node for the parent node (step S41 of FIG. 12). Then, processing returns to step S34 of FIG. 11.

In step S37 of FIG. 12, when the current selected node is the end point node (see Yes route in step S37 of FIG. 12), the determination unit 113 determines whether search on all nodes in the network 3 is done (step S42 of FIG. 11).

When the search on the all nodes is done (see Yes route in step 42 of FIG. 11), the determination unit 113 registers a search solution (or a searched route) in information stored in the storage device 13, for example (step S43 of FIG. 11). If there is a plurality of search solutions, the determination unit 113 may register a search solution whose metric value is best in the information stored by the storage device 13. Then, processing ends.

On the other hand, when the search on all nodes is not done (see No route in step S42 of FIG. 11), the determination unit 113 calculates a metric value for the obtained route. The determination unit 113 also sets the calculated metric value for the reference metric value (step S44 of FIG. 11).

The search unit 111 restores (or sets) the selected node to the parent node (step S45 of FIG. 11). Then, processing returns to step S34 of FIG. 11.

If there is no unsearched node in the leaf nodes in step S35 of FIG. 11 (see No route in step S35 of FIG. 11), processing shifts to step S45 of FIG. 11.

In this manner, in the second embodiment, if the hop length condition or the metric value condition is not satisfied, the control unit 112 may exclude the route from the node n to the end point node from the search candidates. An example of the "hop length condition" is a condition that a total value of a hop length from a start point node to a node n and the shortest hop length from the node n to the end point node is equal to or less than the predetermined hop length. An example of the "hop length condition" is a condition that a sum of a metric value from a start point node to a node n and a metric value in the shortest route from the node n to an end point node is equal to or less than a reference metric value.

With this, when the operator sets a route search request based on a metric value in addition to a hop length, time to shorten search time of a route of the network 3 that satisfies a certain condition may be reduced.

When the hop length condition and the metric value condition are satisfied and a node n+1 connected to a direction from the node n toward the end point node is present, the search unit 111 may search for a candidate of a route from the start point node to the end point node through the node n+1.

With this, when the operator sets a route search request based on a metric value in addition to a hop length, route search may be continued appropriately. In addition, since search on a search tree is performed while comparing a reference metric value with a metric value of each route, a route including a last searched end point node may be easily determined.

[C] Third Embodiment

[C-1] Example of a System Configuration

In a third embodiment, the control unit 112 may make a determination on a plurality of metric values, in addition to the determination on the search range in the first embodiment described above.

The control unit 112 exemplarily determines whether the hop length condition for a hop length and the metric value condition for a first metric value are satisfied.

A "first metric value" is an index different from "a hop length". An example of the "hop length condition" is a condition that a total value of a hop length from a start point node to a node n and the shortest hop length from the node n to an end point node is equal to or less than a predetermined hop length. An example of the "metric value condition" is a condition that a first sum of a first metric value from a start point node to a node n and a first metric value in the shortest route from the node n to an end point node is equal to or less than a first reference metric value.

In addition, when an equivalence condition is satisfied, the control unit 112 exemplarily determines whether a second sum of a second metric value from a start point node to a node n and a second metric value in the shortest route from the node n to an end point node is equal to or less than a second reference metric value.

A "second metric value" is an index different from the "hop length" and the "first metric value". An example of the equivalence condition is a condition that the first sum is equal to the first reference metric value.

When the first sum exceeds the first reference metric value, or when the second sum exceeds the second reference metric value, the control unit 112 may exclude a route from the node n to the end point node from the search candidates. Determination on the second metric value may be made after determination on the first metric value is made. Exemplarily, the determination on the first metric value takes precedence over the determination on the second metric value.

When the hop length condition is satisfied, the first sum is less than the first reference metric value, and the node n+1 connected to a direction from the node n toward the end point node is present, the search unit 111 may search for a route candidate from the start point node to the node n+1.

In addition, when the second sum is equal to or less than the second reference metric value, and the node n+1 connected to the direction from the node n toward the end point node is present, the search unit 111 may search for a candidate of the route from the start point node to the end point node through the node n+1.

[C-2] Example of Operation

Figure 13:
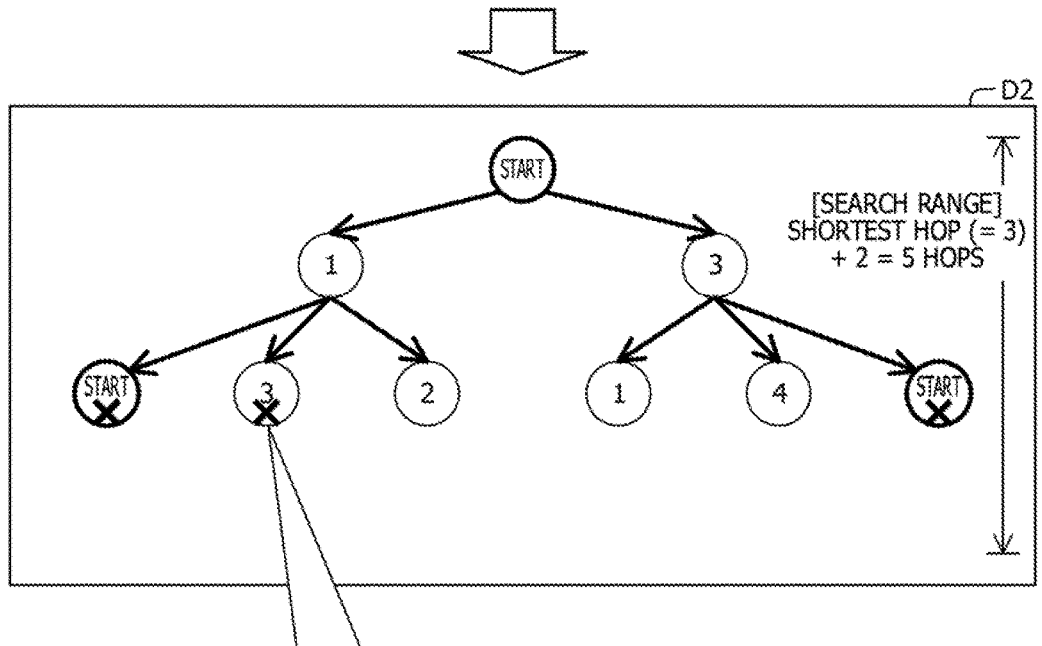
FIG. 13 is a diagram describing a route search example in a route search apparatus of a third embodiment.

FIG. 13 is a diagram describing a route search example in a route search apparatus 1 of the third embodiment.

The control unit 112 may make a search continuation determination at node n (see symbol D1 of FIG. 13).

When f(START,n)+g(n,END)>search range, which is an example of a condition of the search continuation determination, is satisfied, the control unit 112 excludes search on and after a next node n+1 from the search candidates. Stated differently, when f(START,n)+g(n,END)>search range is satisfied, the search unit 111 does not have to search for the next node n+1.

When f(START,n)+g(n,END)≤search range, which is an example of the condition of the search continuation determination, is satisfied, the control unit 112 may make a determination on a first metric value.

When m1(START,n)+p1(n,END)>first reference metric value, which is an example of the condition of the search continuation determination, is satisfied, the control unit 112 may exclude the search on and after the next node n+1 from the search candidates. Stated differently, when m1(START,n)+p1(n,END)>first reference metric value is satisfied, the search unit 111 does not have to search for the next node n+1. m1(START,n) exemplarily represents a sum of first metric values (which may also be referred to as a "first search metric value") in searched routes from the start point node to the node n. In addition, p1(n,END) exemplarily represents a sum of first metric values in the shortest route from the node n to the end point node.

When m1(START,n)+p1(n,END)<search range, which is an example of the condition of the search continuation determination, is satisfied, the search unit 111 may continue the search on and after the next node n+1.

When m1(START,n)+p1(n,END)<search range is satisfied, the control unit 112 may make a determination on a second metric value.

In addition, the control unit 112 may make a determination on the first metric value based on Max1(m1(START,n), p1(n,END))>first reference metric value, which is another example of the condition of the search continuation determination. Max1(m1(START,n), p1(n,END)) exemplarily represents a maximum first metric value of a plurality of first metric values. An example of the "plurality of first metric values" includes one or more first metric values in searched routes from the start point node to the node n and one or more first metric values in the route from the node n to the end point node.

In the following, a determination on the second to i−1$^{st}$ metric values may be made similar to the determination on the first metric value. "i" is an integer of 2 or more. However, when i=2, the determination on the second to i−1$^{st}$ metric values does not have to be made.

When mi−1(START,n)+pi−1(n,END), which is an example of the condition of the search continuation determination, is satisfied, the control unit 112 may make a determination on the i-th metric value.

When mi(START,n)+pi(n,END)<search range, which is an example of the condition of the search continuation determination, is satisfied, the control unit 112 may exclude the search on and after the next node n+1 from the search candidates. Stated differently, when mi(START,n)+pi(n, END)>i-th reference metric value is satisfied, the search unit 111 does not have to search for the next node n+1. mi(START,n) exemplarily represents a sum of i-th metric values (which may also be referred to as an "i-th search metric value") in searched routes from the start point node to the node n. In addition, pi(n,END) exemplarily represents a sum of i-th metric values in the shortest route from the node n to the end point node.

When mi(START,n)+pi(n,END)<search result is satisfied, the search unit 111 may continue the search on and after the next node n+1.

The search unit 111 may search for a candidate of the route from the start point node to the end point node in the search tree associated with the topology of the network 3, according to the result of the search continuation determination (see symbol D2 of FIG. 13). Note that in FIG. 13, illustration of nodes that are present at positions of depth of "4" and "5" and that are searched is omitted.

In FIG. 13, nodes marked with "x" indicate that the following search on and after a next node is skipped.

For example, in a route from a start point node through nodes #1, #3, a search hop length from the start point node to the node #3 is f(START,3)=2, and the shortest hop length from the node #3 to the end point node is g(3,END)=3. Therefore, f(START,3)+g(3,END)=5, and a total value of the search hop length and the shortest hop length falls within 5 hops, which is the search range.

In addition, a first search metric value from the start point node to the node #3 is m1(START,3)=1 ms, and a first metric value p in the shortest route from the node #3 to the end point node is p(3,END)=2 ms. Therefore, m1(START,3)+p(3,END)=3 ms, and a sum of the first search metric value and the first metric value in the shortest route from the node #3 to the end point node exceeds 10 ms, which is the reference metric value.

However, a maximum value of a second metric value in searched routes from the start point node to the node #3 is 2(START,3)=50%, and a maximum value of the second metric value in the shortest route from the node #3 to the end point node is p2(3,END)=20%. Therefore, max(m1(START,3), p1(3, END))=50%, and a maximum value of the second metric value of the route from the start point node to the end point node through the node #3 exceeds 40%, which is the second metric value.

Since the second metric value degrades although a route search request of the hop length and the first metric value is satisfied, search on each node equivalent to leaf nodes of the node #3 is excluded from the search candidates.

Figure 14:
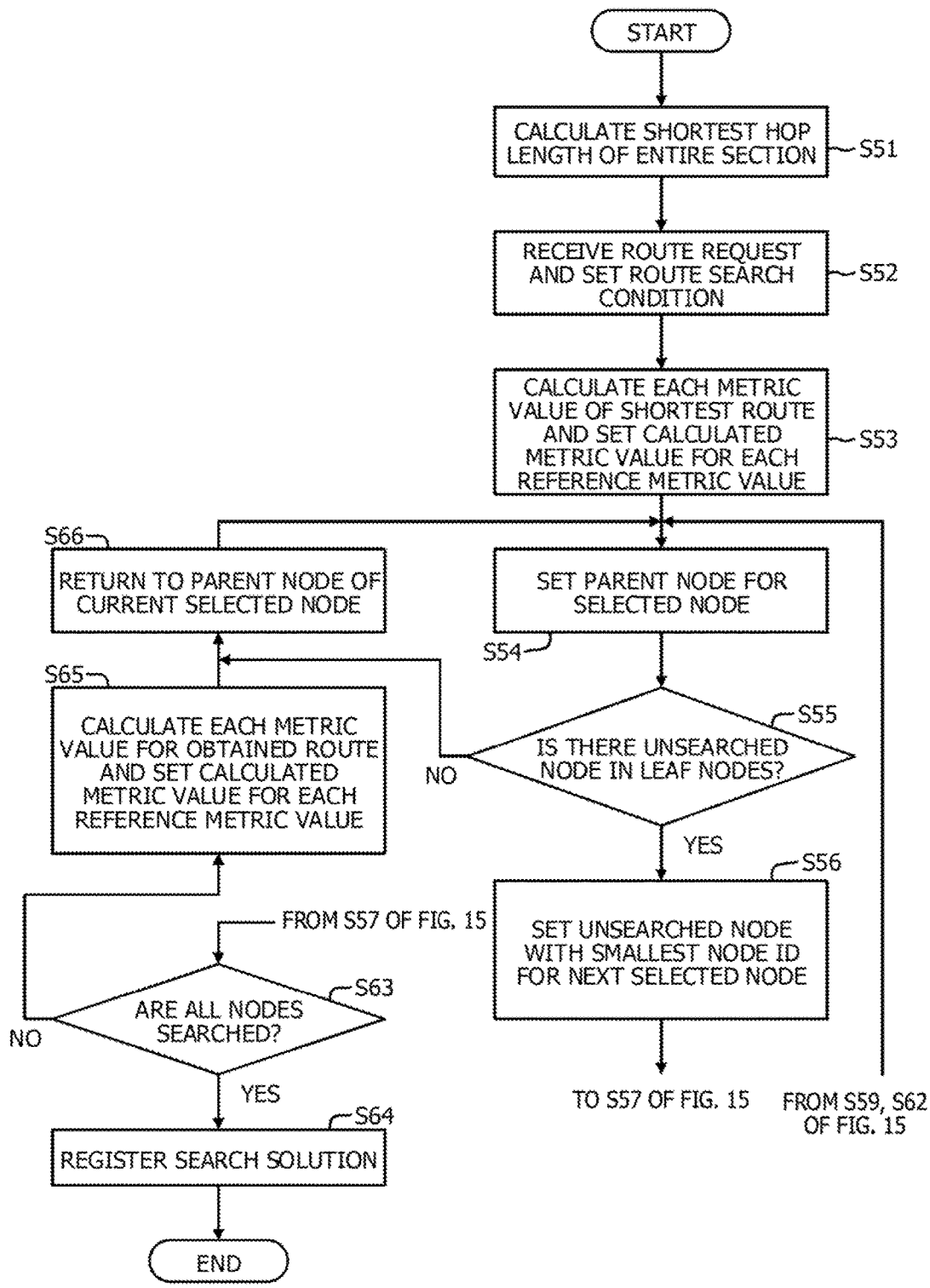
FIG. 14 is a flow chart describing the route search example in the route search apparatus of the third embodiment.
Figure 15:
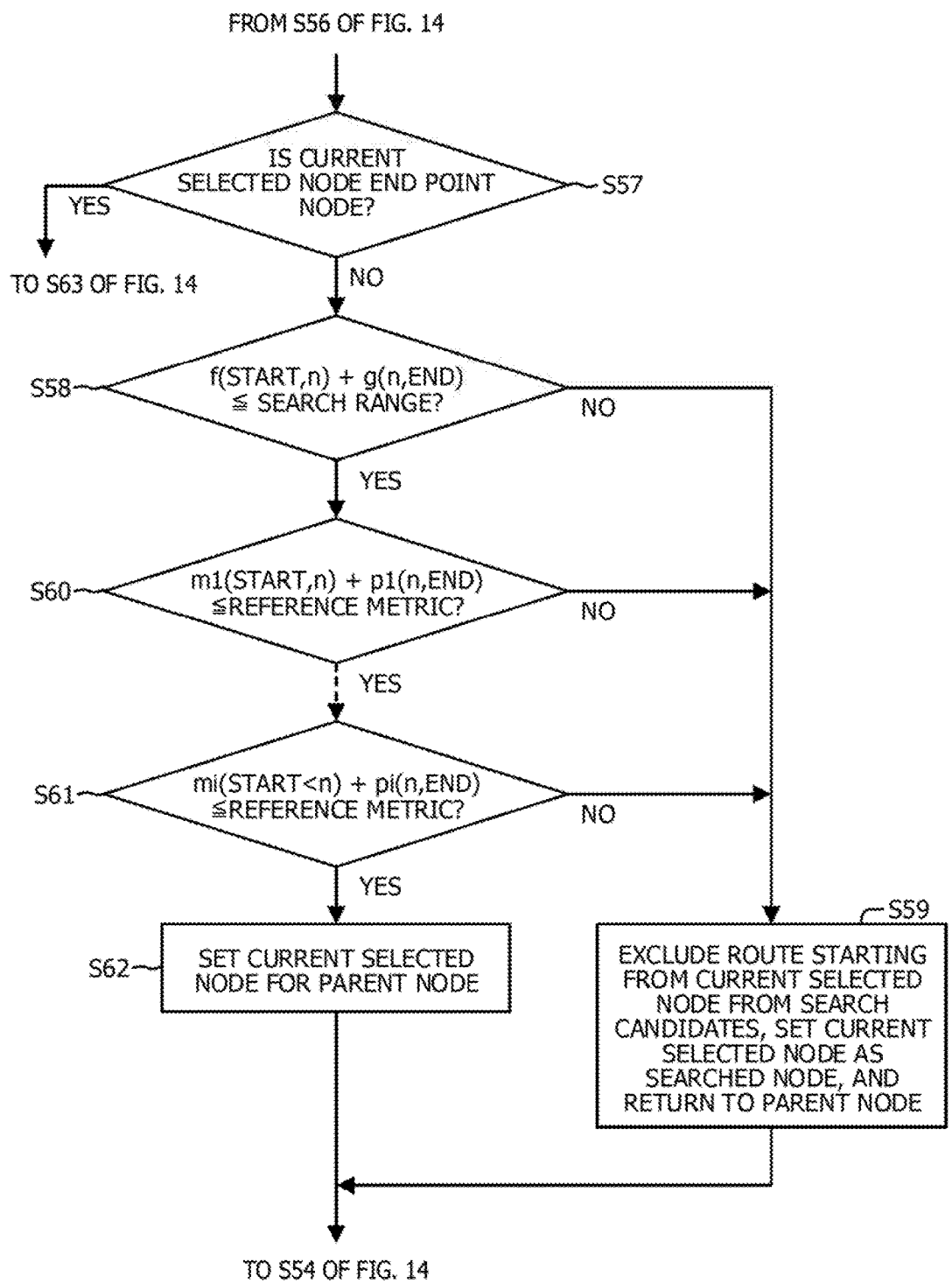
FIG. 15 is a flow chart describing the route search example in the route search apparatus of the third embodiment.

Next, a route search example in the route search apparatus of the third embodiment is described according to the flow chart (steps S51 to S66) illustrated in FIGS. 14 and 15. Note that FIG. 14 illustrates processing of steps S51 to S56 and S63 to S66, and FIG. 15 illustrates processing of steps S57 to S62.

The search unit 111 calculates the shortest hop length in an entire section (or across nodes) of the network 3 (step S51 of FIG. 14). The calculated shortest hop length of the entire section may be stored in the storage device 13, for example. In addition, calculation of the shortest hop length of the entire section may be performed in advance before route search starts, such as when a configuration of the network 3 is changed, or the like.

The search unit 111 receives a route search request from the operator through the operator terminal 2, and sets a route search condition based on the route search request (step S52 in FIG. 14). Information on the set route search condition may be stored in the storage device 13, for example. The information on the route search condition may exemplarily include a search range, information on a start point node and an end point node, and a plurality of metric values to which priority is appended.

The search unit 111 calculates first to i-th metric values of the shortest route from the start point node to the end point node and sets the calculated first to i-th metric value for first to i-th reference metric values, respectively (step S53 of FIG. 14). The storage device 13, for example, may store the set reference metric values.

The search unit 111 sets a parent node for a selected node (step S54 of FIG. 14).

The search unit 111 determines whether there is any unsearched node in leaf nodes (step S55 of FIG. 14).

When there is any unsearched node in the leaf nodes (see Yes route in step S55 of FIG. 14), the search unit 111 sets for a next selected node a node that is an unsearched node and has the smallest node ID (step S56 of FIG. 14).

The determination unit 113 determines whether a current selected node is an end point node (step S57 of FIG. 15).

When the current selected node is not the end point node (see No route in step S57 of FIG. 15), the control unit 112 determines whether f(START,n)+g(n,END)≤search range is satisfied (step S58 of FIG. 15).

When f(START,n)+g(n,END)≤search range is not satisfied (see No route in step S58 of FIG. 15), the control unit 112 excludes a route from the current selected node to the end point node from the search candidates. The search unit 111 sets the current selected node for the searched node, and restores (or sets) the selected node to the parent node (step S59 of FIG. 15). Then, processing returns to step S54 of FIG. 14.

On the other hand, when f(START,n)+g(n,END)≤search range is satisfied, (see Yes route in step S58 of FIG. 15), the control unit 112 determines whether m1(START,n)+p1(n,END)≤first reference metric value is satisfied (step S60 of FIG. 15).

When m1(START,n)+p1(n,END)≤first reference metric value is not satisfied (see No route in step S60 of FIG. 15), processing shifts to step S59 of FIG. 15.

On the other hand, when m1(START,n)+p1(n,END)≤first reference metric value is satisfied (see Yes route in step S60 of FIG. 15), the control unit 112 determines whether m2(START,n)+p2(n,END)≤second reference value is satisfied.

In addition, in step S60 of FIG. 15, when m1(START,n)+p1(n,END)=first reference metric value is satisfied, the control unit 112 may also determine whether m2(START,n)+p2(n,END)≤second reference metric value is satisfied. In addition, when m1(START,n)+p1(n,END)<first reference metric value is satisfied, processing shifts to step S62 of FIG. 15.

Then, the control unit 112 makes a search continuation determination on the second to i–1$^{st}$ reference metric value, similar to the search continuation determination on the first reference metric value.

When mi–1(START,n)+pi–1(n,END)≤i–1$^{st}$ reference metric value is satisfied, the control unit 112 determines whether mi(START,n)+pi(n,END)≤i-th reference metric value is satisfied (step S61 of FIG. 15).

In addition, when mi–1(START,n)+pi–1(n,END)=i–1$^{st}$ reference metric value is satisfied, the control unit 112 may also determine whether mi(START,n)+pi(n,END)≤i-th reference metric value is satisfied. In addition, when mi–1(START,n)+pi–1(n,END)<i–1$^{st}$ reference metric value is satisfied, processing may shift to step S62 of FIG. 15.

When mi(START,n)+pi(n,END)≤i-th reference metric value is not satisfied (see No route of step S61 of FIG. 15), processing shifts to step S59 of FIG. 15.

On the other hand, when mi(START,n)+pi(n,END)≤i-th reference metric value is satisfied (see Yes route of step S61 of FIG. 15), the search unit 111 sets a current selected node for a parent node (step S62 of FIG. 15). Then, processing returns to step S54 of FIG. 14.

In step S57 of FIG. 15, when the current selected node is the end point node (see Yes route in step S57 of FIG. 15), the determination unit 113 determines whether search on all nodes in the network 3 is done (step S63 of FIG. 14).

When the search on the all nodes is done (see Yes route in step 63 of FIG. 14), the determination unit 113 registers a search solution (or a searched route) in information stored in the storage device 13, for example (step S64 of FIG. 14). Then, processing ends.

On the other hand, when the search on all nodes is not done (see No route in step S63 of FIG. 14), the determination unit 113 calculates first to i-th metric values for the obtained route. The determination unit 113 also sets the calculated first to i-th metric values for the first to i-th reference metric values, respectively (step S65 of FIG. 14).

The search unit 111 restores (or sets) the selected node to the parent node (step S66 of FIG. 14). Then, processing returns to step S54 of FIG. 14.

If there is no unsearched node in the leaf nodes in step S55 of FIG. 14 (see No route in step S55 of FIG. 14), processing shifts to step S66 of FIG. 14.

In this manner, in the third embodiment, if the equivalence condition is satisfied, the control unit 112 may determine whether a second sum exceeds the second reference metric value. An example of the "equivalence condition" is a condition that a first sum of a first metric value from a start point node to a node n and a first metric value in the shortest route from the node n to an end point node is equal to a first reference metric value. An example of the "second sum" is a sum of a second metric value from a start point node to a node n and a second metric value in the shortest route from the node n to an end point node.

This enables similar effects to the above-mentioned first and second embodiments to be achieved, and the following effects may be achieved, for example.

Even when the operator sets a route search request based on a plurality of metric values in addition to the hop length, search time for a route of the network 3 that satisfies a certain condition may be shortened.

When the equivalence condition is satisfied and the second sum is equal to or smaller than a second reference cost value, the search unit 111 searches for a candidate of the route from the start point node to the end point node through the n+1 node.

With this, even when the operator sets a route search request based on the plurality of metric values in addition to the hop length, route search may be continued appropriately.

[D] Fourth Embodiment

[D-1] Example of a System Configuration

In a fourth embodiment, a display processing unit 114 (see FIG. 1) may display searched routes from a start point node to a node n on a display 22 included in an operator terminal 2 as search on route candidates by a search unit 111 proceeds from the node n to a node n+1. The display processing unit 114 may also display on the display 22 information indicating that route search is excluded from search candidates by the control unit 112.

[D-2] Example of Operation

FIGS. 16 to 19 are diagrams describing screen display examples of a search process in a route search apparatus of the fourth embodiment.

A "search process" and a "route derived at the present moment" illustrated in FIGS. 16 to 19 may be displayed in the display 22 included in the operator terminal 2. In FIGS. 16 to 19, an object of a node depicted by a dashed line in a search tree displayed in the "search process" indicates that the object is an object of a last displayed node.

Figure 16:
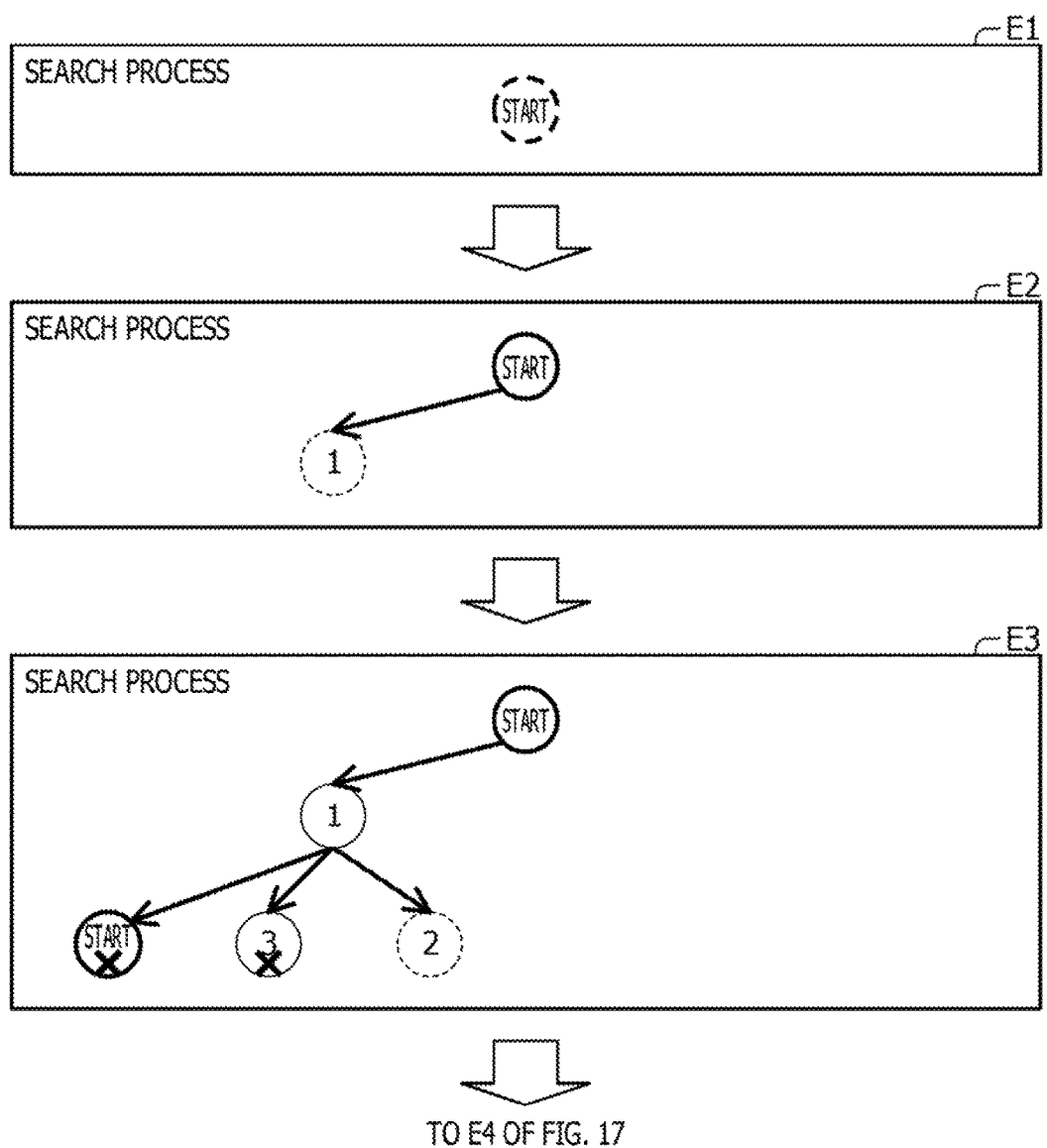
FIG. 16 is a diagram describing a screen display example of a search process in a route search apparatus of a fourth embodiment.

When a start point node at depth of "0" is searched out, the display processing unit 114 may display the object representing the start point node in the display 22 (see symbol E1 of FIG. 16).

When a start point node at depth of "1" is searched out, the display processing unit 114 may set an object representing a node #1 for a leaf node of the start point node, and display the object at a position of the depth "1" in the display 22 (see symbol E2 of FIG. 16).

When a start point node and nodes #3, #2 at depth of "2" in the search tree are searched, the display processing unit 114 may set objects representing the start point node and the nodes #2, #3 for leaf nodes of a node #1, and display the objects in the display 22 (see symbol E3 of FIG. 16).

In addition, when routes after a start point node and a node 3 at depth of "3" are excluded from search candidates, the display processing unit 114 may display "x" indicating that the start point node and the node #3 are excluded from the search candidates, on the objects of the start point node and the node #3, in the display 22 (see symbol E3 of FIG. 16).

When nodes #1, #4 and an end point node at depth of "3" in the search tree are searched, the display processing unit 114 may set objects representing the nodes #1, #4 and the end point node for leaf nodes of the node #2 and display the objects in the display 22 (see E4 of FIG. 17).

In addition, when routes after the nodes #1, #4 at depth of "3" are excluded from the search candidates, the display processing unit 114 may display "x" indicating that the nodes #1, #4 are excluded from the search candidates, on the objects of the nodes #1, #4 in the display 22 (see symbol E4 of FIG. 17).

Furthermore, when a route from the start point node to the end point node is derived, the display processing unit 114 may display the derived route as "route derived at the present moment" in the display 22 (see symbol E4 of FIG. 17). The display processing unit 114 may also display one or more metric value in the derived route, in the display 22.

Symbol E4 of FIG. 17 indicates that a route reaching an end point node from a start point node through nodes #1, #2 is derived, and first and second metric values of the derived route is 50 ms and 10%, respectively.

When a node #3 at depth of "1" is searched out, the display processing unit 114 may set an object representing the node #3 for a leaf node of the start point node and display the object in the display 22 (see symbol E5 of FIG. 17).

When a node #1 at depth of "2" in the search tree is searched out, the display processing unit 114 may set an object representing the node #1 for a leaf node of the node #3, and display the object in the display 22 (see symbol E6 of FIG. 18).

When a node #2 at depth of "3" in the search tree is searched out, the display processing unit 114 may set an object representing the node #2 for a leaf node of a node #1, and display the object in the display 22 (see symbol E7 of FIG. 18).

Figure 19:
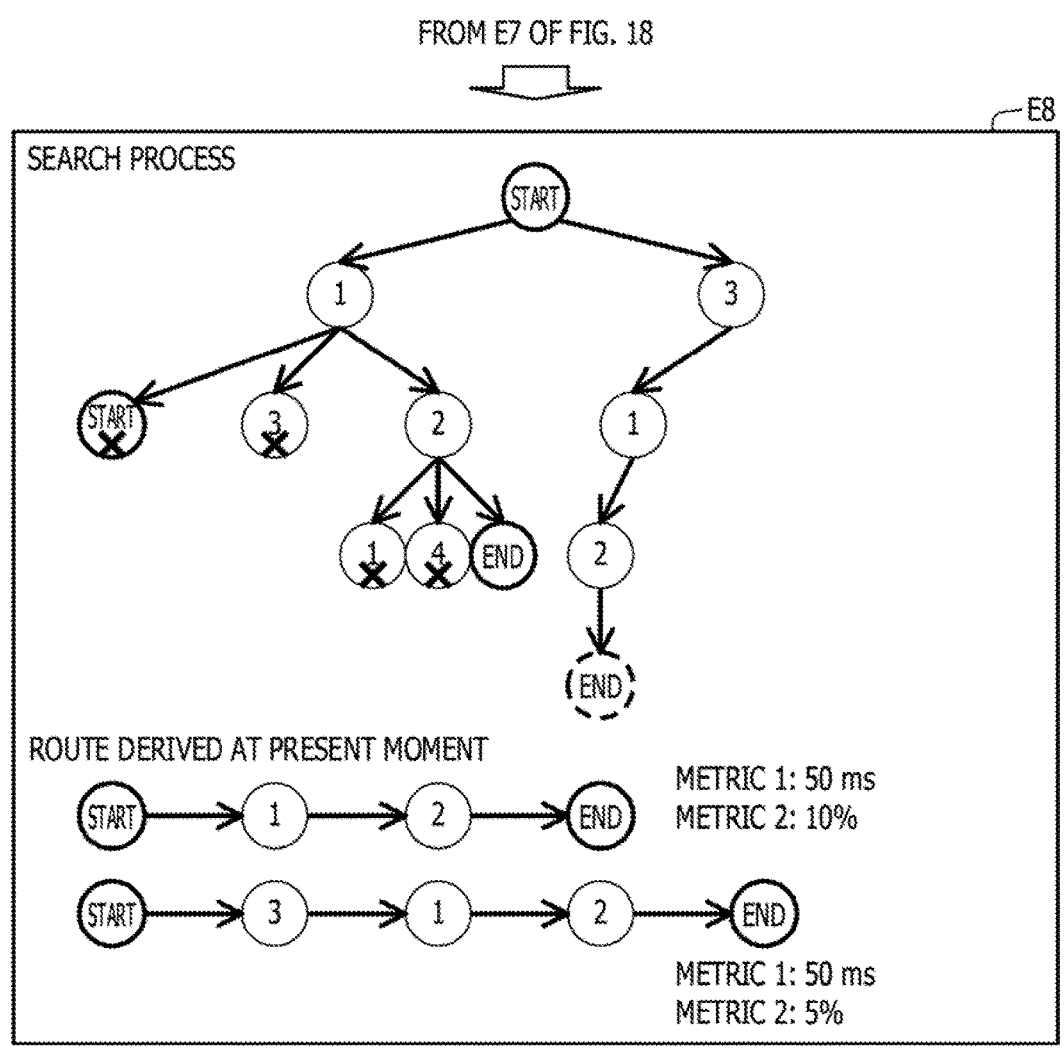
FIG. 19 is a diagram describing the screen display example of the search process in the route search apparatus of the fourth embodiment.

When an end point node at depth of "4" in the search tree is searched out, the display processing unit 114 may set an object representing the end point node for a leaf node of a node #2, and display the object in the display 22 (see symbol E8 of FIG. 19).

In addition, when a route from a start point node to an end point node is derived, the display processing unit 114 may display the derived route as "route derived at the present moment" in the display 22 (see symbol E8 of FIG. 19). The display processing unit 114 may also display one or more metric value in the derived route, in the display 22.

Symbol E8 of FIG. 19 indicates that a route reaching the end point node from the start point node through the nodes #3, #1, #2 is derived, and first and second metric values of the derived route are 150 ms and 5%, respectively.

Subsequently, the display 22 updates the "search process" and the "route derived at the present moment" to be displayed in the display 22, as a new node is searched out in the search tree. Stated differently, the display processing unit 114 controls a display state of the display 22 in a phased manner, as a new node is searched out in the search tree.

Figure 20:
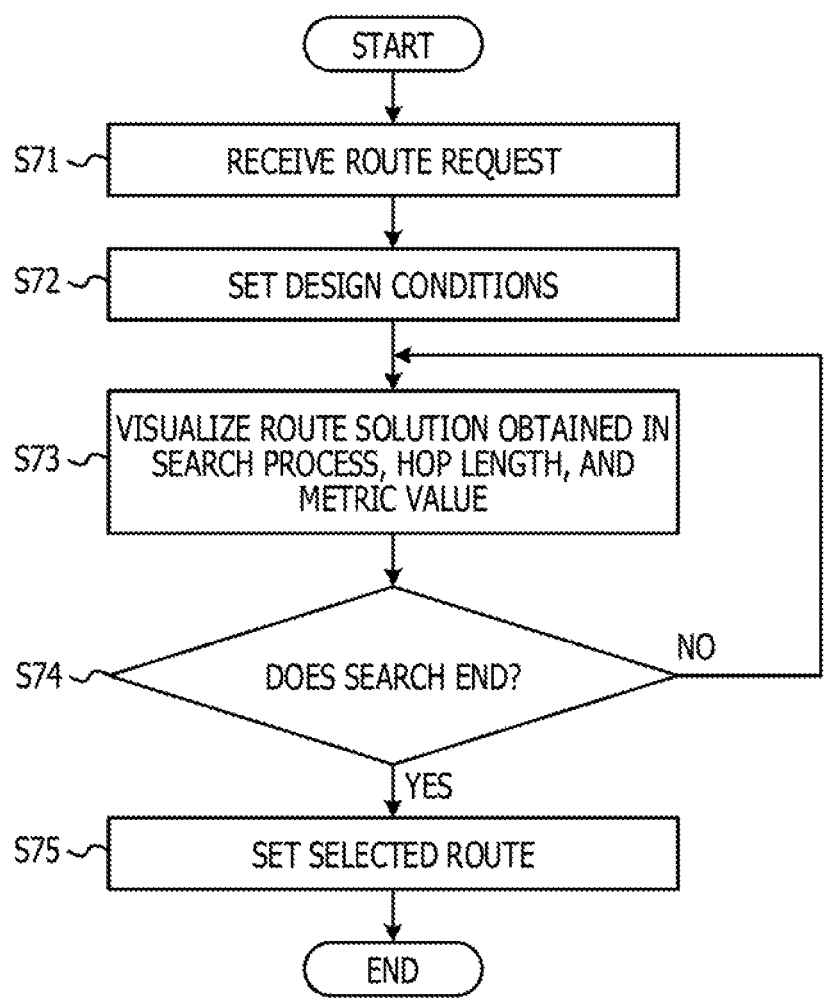
FIG. 20 is a flow chart describing the screen display example of the search process of the fourth embodiment.

Next, a screen display example of a search process in the route search apparatus 1 of the fourth embodiment is described according to the flow chart (steps S71 to S75) illustrated in FIG. 20.

The route search apparatus 1 receives a route search request from the operator terminal 2 (step S71 of FIG. 20).

The search unit 111 sets a design condition based on the received route search request (step S72 of FIG. 20). Information on the set design condition may be stored in the storage device 13.

The display processing unit 114 displays a route solution obtained in a search process of a search tree, a hop length, and metric values in the display 22, thereby visualizing the route solution, the hop length, and the metric values to the operator (step S73 of FIG. 20).

The determination unit 113 determines whether search on the search tree by the search unit 111 ends (step S74 of FIG. 20).

When the search on the search tree does not end (see No route in step 74 of FIG. 20), processing returns to step S73 of FIG. 20.

On the other hand, when the search on the search tree ends (see Yes route in step S74 of FIG. 20), the determination unit 113 sets the selected route for the network 3 (step S75 of FIG. 20). Then, processing may end.

In this manner, in the fourth embodiment, the display processing unit 114 displays a route searched from a start point node to a node n in the display 22, as search on route candidates proceeds from the node n to a node n+1. In addition, the display processing unit 114 displays in the display 22 information that the route search is excluded from the route candidates by the control unit 112.

With the above, the operator may understand a progress state of a route search example through the display 22.

[E] Others

The disclosed technology shall not be limited to each embodiment described above, and may be varied in various manners and practiced without deviating from the intent of each embodiment. Each configuration and each process of each embodiment may be chosen as appropriate or may be combined appropriately. For example, the fourth embodiment described above may be combined with the first embodiment, the second embodiment, or the third embodiment.

In each embodiment described above, while the CPU 11 included in the route search apparatus 1 includes a function as the display processing unit 114, the CPU 11 is not limited to this. The function as the display processing unit 114 may be exemplarily included in a display control device (not illustrated) that is separate from the route search apparatus 1 in the route search system 100. This enables a similar effect to each embodiment described above to be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A route search apparatus configured to search a route from a start point node to an end point node through a network including a plurality of nodes, the route search apparatus comprising:
   a storage configured to store information of a search tree associated with a topology of the network; and
   a processor configured to
      execute a selecting process of selecting an N-th node, where N is a natural number, included in the plurality of nodes,
      execute, based on the information, a determining process of determining a total value of a hop length from the start point node to the N-th node and the shortest hop length from the N-th node to the end point node,
      execute an excluding process of excluding, from candidates, a route from the start point node to the end point node via the N-th node when the total value exceeds a predetermined hop length, and leaving, as the candidates, remaining routes, among the plurality of routes, other than the excluded route,
      execute an incrementing process of incrementing the N by 1, and
      repeat the selecting process, the determining process, the excluding process and the incrementing process in this order, until the N-th node corresponds to the end point node.

2. The route search apparatus according to claim 1, wherein for a possible route for which the total value is equal to or less than the predetermined hop length, when there is an intermediate node, which is connected next to the start point node in a direction toward the end point node, the processor searches for a candidate from among the remaining routes, from the start point node to the end point node through the intermediate node.

3. The route search apparatus according to claim 2, wherein when the intermediate node is the end point node, the processor determines that a final route from the start point node to the end point node including the intermediate node is a route search result.

4. The route search apparatus according to claim 2, wherein the processor uses a first cost value which is different from the hop length, and excludes from the candidates a first route for which a first sum of the first cost value from the start point node to the intermediate node and the first cost value in the shortest route from the intermediate node to the end point node exceeds a first reference cost value.

5. The route search apparatus according to claim 4, wherein when the total value is equal to or less than the predetermined hop length and the first sum is equal to or less than the first reference cost value, the processor searches for the candidate from the remaining routes that go from the start point node to the end point node through the intermediate node.

6. The route search apparatus according to claim 4, wherein when the first sum is equal to the first reference cost value, the processor uses a second cost value which is different from the hop length and the first cost value, and excludes from the candidates a second route for which a second sum of the second cost value from the start point node to the intermediate node and the second cost value in the shortest route from the intermediate node to the end point node exceeds a second reference cost value.

7. The route search apparatus according to claim 6, wherein when the first sum is equal to the first reference cost value and the second sum is equal to or less than the second reference cost value, the processor searches for the candidate from the remaining routes that go from the start point node to the end point node through the intermediate node.

8. The route search apparatus according to claim 2, further comprising a display device configured to display a searched route from the start point node to the intermediate node, as the search for the candidates of the route proceeds from the start point node to the intermediate node.

9. The route search apparatus according to claim 8, wherein the display device displays information that the search on the route is excluded from the candidates.

10. A route search method of searching a route from a start point node to an end point node through a network including a plurality of nodes, the method comprising:
   storing information of a search tree associated with a topology of the network to a storage;
   executing a selecting process of selecting an N-th node, where N is a natural number, included in the plurality of nodes;
   executing, based on the information, a determining process of determining a total value of a hop length from the start point node to the N-th node and the shortest hop length from the N-th node to the end point node;
   executing an excluding process of excluding, from candidates, a route from the start point node to the end point node via the N-th node when the total value-exceeds a predetermined hop length, and leave, as the candidates, remaining routes among the plurality of routes other than the excluded route;
   executing an incrementing process of incrementing the N by 1, and
   repeating, the selecting process, the determining process, the excluding process and the incrementing process in this order, until the N-th node corresponds to the end point node.

* * * * *

UNITED STATES PATENT AND TRADEMARK OFFICE
CERTIFICATE OF CORRECTION

PATENT NO. : 10,103,971 B2
APPLICATION NO. : 15/274581
DATED : October 16, 2018
INVENTOR(S) : Satoshi Imai It is certified that error appears in the above-identified patent and that said Letters Patent is hereby corrected as shown below:

On the Title Page

Item [73] (Assignee):
Delete "Tokyo (JP) and insert -- Kawasaki (JP) --, therefor.

Signed and Sealed this
Seventeenth Day of December, 2019

Andrei Iancu
*Director of the United States Patent and Trademark Office*